June 17, 1952 A. M. KRUEGER ET AL 2,601,154

MEMORY DEVICE

Filed Jan. 24, 1948 9 Sheets-Sheet 1

INVENTOR
ALFRED M. KRUEGER
AND ROLF H. PETERSON
BY: Robert Irving Williams
ATTORNEY INVENTOR
ALFRED M. KRUEGER
AND ROLF H. PETERSON
BY: Robert Irving Williams
ATTORNEY

MEMORY DEVICE

Filed Jan. 24, 1948 9 Sheets-Sheet 3

INVENTOR
ALFRED M. KRUEGER
AND ROLF H. PETERSON
BY: Robert Irving Williams
ATTORNEY June 17, 1952 A. M. KRUEGER ET AL 2,601,154

MEMORY DEVICE

Filed Jan. 24, 1948 9 Sheets-Sheet 4

INVENTOR
ALFRED M. KRUEGER
AND ROLF H. PETERSON
BY: Robert Irving Williams
ATTORNEY

MEMORY DEVICE

Filed Jan. 24, 1948 9 Sheets-Sheet 5

INVENTOR
ALFRED M. KRUEGER
AND ROLF H. PETERSON
BY: Robert Irving Williams
ATTORNEY June 17, 1952 A. M. KRUEGER ET AL 2,601,154

MEMORY DEVICE

Filed Jan. 24, 1948 9 Sheets-Sheet 6

INVENTOR
ALFRED M. KRUEGER
AND ROLF H. PETERSON
BY: Robert Irving Williams
ATTORNEY INVENTOR
ALFRED M. KRUEGER
AND ROLF H. PETERSON
BY: Robert Irving Williams
ATTORNEY June 17, 1952 A. M. KRUEGER ET AL 2,601,154

MEMORY DEVICE

Filed Jan. 24, 1948 9 Sheets-Sheet 8

INVENTOR.
ALFRED M. KRUEGER
AND ROLF H. PETERSON
BY: Robert Irving Williams

INVENTOR.
ALFRED M. KRUEGER
AND ROLF H. PETERSON
BY: Robert Irving Williams

Patented June 17, 1952 | 2,601,154

UNITED STATES PATENT OFFICE 2,601,154

MEMORY DEVICE

Alfred M. Krueger, Brooklyn, N. Y., and Rolf H. Peterson, Bergenfield, N. J., assignors to Peterson & Krueger, Inc., New York, N. Y., a corporation of New York Application January 24, 1948, Serial No. 4,104

28 Claims. (Cl. 161—1)

This invention relates to devices of the type variously known as "preselector devices," "memory devices," "control storage means," and the like, and which, essentially, embody means for designating selecting signals, means for recording such signals in reproducible form at the time they are put in, and means for taking off signals based on the aforesaid signals at predetermined or desired later times. Such devices have a wide variety of applications, among which radio control apparatus and record players come particularly to mind, but which include such widely diverse fields as vending machines, games, and sequence-controls for machinery.

A considerable number of types of such apparatus have been proposed for use and a few of these are actually in operation; but their general use has been held back by various deficiencies, and their application to many of the fields which are open to them has been prevented by various lacks in the conceptions on which they are based.

Among the features which are important in machines of the type under consideration are wide flexibility of operation; ease and speed in the putting in and taking out of signals; the ability to put in signals while signals are being taken out; the ability to record a single input impulse in a pattern for selective output control; and the provision for a maximum of delay, when desired, between operations of the input and take-off means.

With the foregoing and other considerations in view, the present invention contemplates the provision of a device which will embody as many as possible of such features and which will have such qualities to a maximum extent. In various of its more specific aspects, the invention contemplates the provision of a device embodying all of the foregoing features in a high degree; the provision of effective means for clearing a record impression from the recording means at a suitable stage after the take-off of the impression; the provision of means for recording a series of signals in individual or pattern form; the provision of means for taking off of the members of the series in the same order as received; the provision of improved electro-mechanical means for putting in and taking off the signals; the provision of an electro-mechanical means to control the intervals between taking off of successive ones of the series; the provision of means having a storage capacity of an entirely different order from any previously known; and the provision of various greatly improved features of construction and operation.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention, reference should be had to the following detailed description taken in connection with the accompanying drawings, in which.

Figures 1, 2, 3, 4, 5, 6:
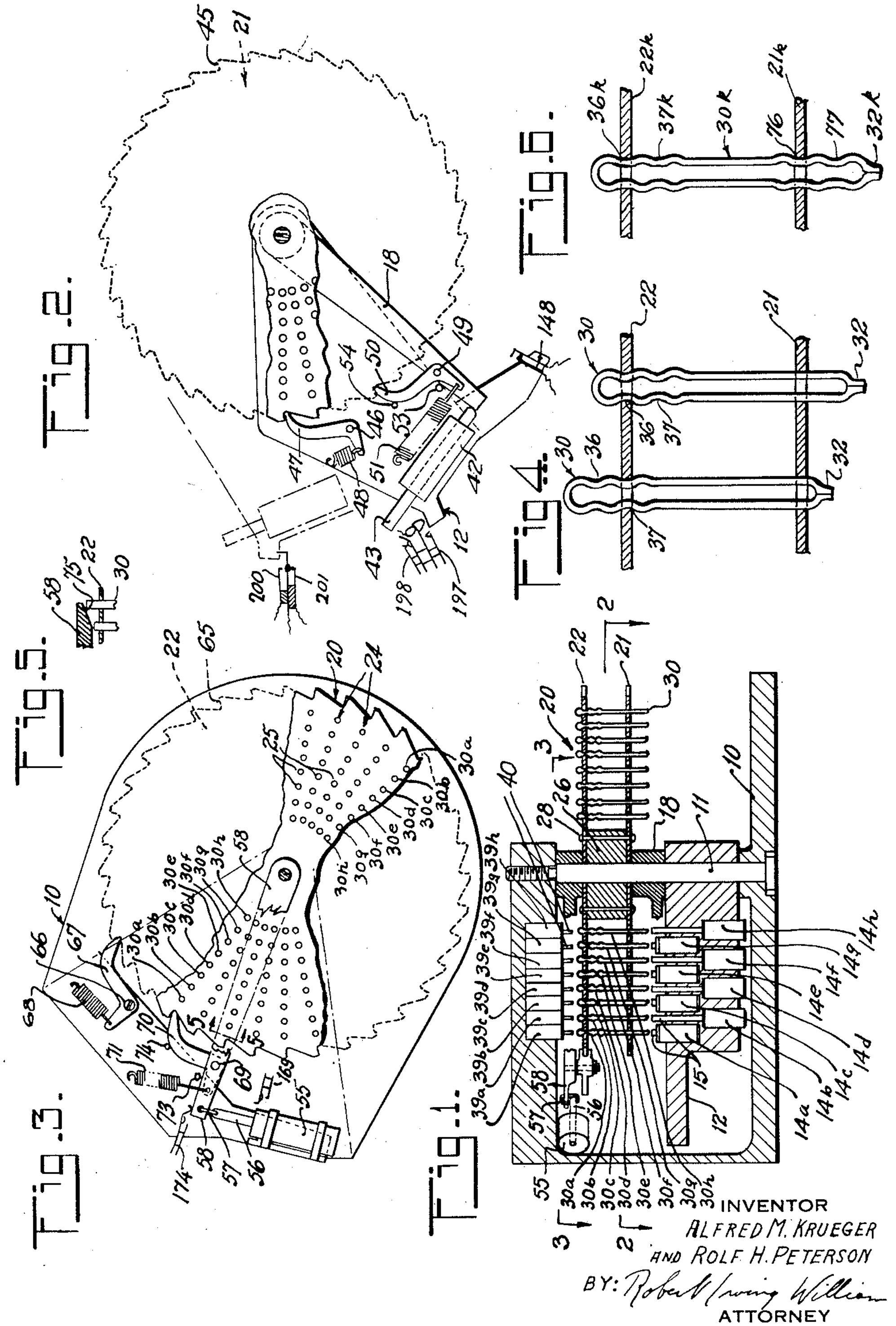
Figure 1 is a cross-sectional view of one form of selector means embodying the invention.
Fig. 2 is a fragmentary sectional view along the line 2—2 of Fig. 1.
Fig. 3 is a fragmentary sectional view along the line 3—3 of Fig. 1.
Fig. 4 is an enlarged fragmentary view illustrating the pins in detail.
Fig. 5 is a fragmentary sectional view along the line 5—5 of Fig. 3.
Fig. 6 is a view similar to Fig. 4 showing an alternative form of pins.

In the form of construction shown in Fig. 1 there is provided a frame 10 to which a vertical shaft 11 is fixedly secured. Rotatably mounted on the lower part of the shaft 11 is a supporting arm 12 carrying a plurality of solenoids 14 having upwardly movable plungers 15. Eight solenoids designated respectively as 14*a*, 14*b*, 14*c*, 14*d*, 14*e*, 14*f*, 14*g*, and 14*h* are provided in the present instance. Above the supporting arm 12 is an indexing arm 18 which is rotatably mounted on the shaft 11 independently of the arm 12. Above the arm 18 is a memory unit 20 rotatably mounted on the shaft 11 and is freely movable with respect to the arms 12 and 18. It is composed of a pair of disks 21 and 22 and a hub portion 26, the whole being united by rivets 28. The disks are formed with alined rows 24 of holes 25. Each pair of holes contains a pin 30 which, as exemplified, is composed of two spring arms converging at their bottom at 32 and having upper inward bends 36 and lower inward bends 37 either of which will grip the sides of the hole in the disk 22 in which the pin fits. When the upper inward bends 36 are alined with the disk 22, an upward movement of the pins against the resiliency of their spring arms will bring the lower indentations 37 in alinement with the disk 22; and a later downward movement of pins will reverse this action. Thus each pin may occupy either of two vertical positions and may be moved from one position to the other simply, easily, and effectively. In each row 24 there are provided in the present instance eight pins 30 so arranged that the pins of any row may be alined with the plungers 15 of the solenoids 14. The pins in a row from the outermost to the innermost are designated as 30*a*, 30*b*, 30*c* 30*d*, 30*e*, 30*f*, 30*g*, and 30*h*. On an upper portion of the frame 10 are a plurality of switches 39*a*, 39*b*, 39*c*, 39*d*, 39*e*, 39*f*, 39*g*, and 39*h* carrying downwardly-extending contact wiper arms 40 of such length that they will contact a pin 30 which is in an uppermost position, but not a pin 30 which is in a lowermost position. In the present instance the switches are so arranged that their wipers will be alined with the pins 30 of any row which may be brought into position. Any pin 30 which is raised will engage a wiper 40 and close the contact of switch 39.

The arm 12 carries near its outer end a solenoid 42 having a plunger 43 adapted to bear against the outer end of the arm 18. The periphery of the disk 21 is shaped in the form of a ratchet by the provision of saw-tooth notches 45, and there is pivoted at 46 on the arm 12 a pawl 47 held against the periphery of the disk 21 by a spring 48. Pivoted on the arm 18 at 49 is a pawl 50. A spring 51 serves to pull the pawl 50 against the notched periphery of the disk 21, and at the same time to draw the pawl and the arm 18 toward the end of the plunger 43. A pin 53 acts as a stop for such movement, and a pin 54 serves to positively prevent the pawl 50 from being moved outwardly until the plunger 43 moves the arm 18 and the pawl in a counterclockwise direction (Figs. 2 and 3) relative to the disk 21. Clockwise movement of the unit 20 with respect to the arm 12 is thus effectively prevented.

On the underside of the upper portion of the frame 10 there is mounted a solenoid 55 adapted when energized to draw in a plunger 56 which is connected by a link 57 to an arm 58 which is rotatably mounted on the shaft 11. The periphery of the disk 22 is notched as at 65, and there is pivoted at 66 on the underside of the upper portion of the frame 10 a pawl 67 which is normally held in place by a spring 68. Pivotally mounted at 69 on the arm 58 is a pawl 70, and a spring 71 serves to normally hold this pawl in place and to draw the arm away from the solenoid 55, a stop pin 73 being provided to limit this movement. A pin 74 serves to hold the pawl 70 in place and prevent any movement of the unit 20 until the arm 58 and the pawl 70 are moved in a counterclockwise direction (Figs. 2 and 3).

As will be seen from Fig. 5 the arm 58 has an inclined lower surface 75 which extends into the path of relative movement of the arm and of those pins 30 which are in an upward position, so that relative movement of the arm 58 and the unit 20 under the influence of the solenoid 55 and the pawl 70 will result in restoring to their normal lower position whatever pins 30 have been moved to an upper position in any row.

Upon the energization of selected ones of the solenoids 14 (e. g. solenoids 14*b*, 14*d*, and 14*e*) the plungers 15 thereof will be lifted and will lift corresponding pins in that row 24 which is directly above the plungers (e. g. 30*b*, 30*d*, and 30*e*). At the completion of the incoming signal the selected solenoids 14 are de-energized and the solenoid 42 is energized to cause a stepping or "indexing" of the unit 20 with respect to the arm 12. This results from the movement of the plunger 43 against the arm 18 in a direction which will stretch the spring 51. The arm 18 is moved enough to carry the pawl 50 in a counterclockwise direction (Fig. 2) from one notch to the next. During this action the supporting arm 12 is prevented from moving in a clockwise direction relative to the disk 21 by the holding pawl 47. When the solenoid 42 is de-energized, the spring 51 pulls the arm 12 and the arm 18 together until stop 53 contacts the arm 18. During this action the pawl 47 ratchets to the next notch 45. The pin 54 now serves to hold the pawl 50 in place and to lock the arm 12 and the disk 21 together. This completes an index cycle of the arm 12, and the selector means is ready to receive another coded signal or pattern of signals. These can be put in until the arm 12 has rotated thru 340° with respect to the frame 10 in the present instance; or, at any time after a row of pins has been positioned.

Signals may be taken off either after or simultaneously with the putting in of signals and until all the signals which have been put in are taken off. In the taking off of signals the wiper contact arms 40 serve to operate the switches 39 wherever there are pins 30 in an upper position. After a signal has been picked off and sent out, the taking off of the next signal is initiated by the energization of solenoid 55 to move the arm 58 in a counterclockwise position (Fig. 3) to index the pawl 70 one notch against the pull of the spring 71 to move the arm 58 in a new position with respect to the disk 22.

During this action, disk 20 is prevented from following the arm 58 by the holding pawl 67 which is pivoted at 66 on frame 10. When the solenoid 55 is de-energized, the spring 71 pulls the arm 58 back to the stop pin 73, thus indexing the disk 22 (and the disk 21) in a clockwise direction. Pin 74 on frame 10 holds pawl 70 in a notch 65 of disk 22 thereby locking the relative position of disk 22 and frame 10. The unit 20 being locked to the arm 12 at this stage, the arm 12 likewise moves one step in a clockwise direction with the movement of the arm 58. This may be repeated as often as desired as long as settings have been imparted to a sufficient number of rows 24 of the pins 30.

A wide variety of constructional changes may, of course, be made. For example, the pins may be formed as shown in Fig. 6, wherein the parts are indicated by similar reference numerals distinguished by the subscript *k*. The pin 30*k* here illustrated contains not only inward bends 36*k* and 37*k* adapted to mate with the upper disk 22*k*, but also inward bends 76 and 77 adapted to mate with the lower disk 21*k*, thus giving a particularly effective holding action.

A selector means or "memory device" of the general character described above may be utilized in a wide number of applications including radio program selectors, phono-record selectors, television program selectors, power substation controls, sequence controls for automatic machinery, sequence controls for process machinery, fully automatic record playing stations for subscribers, calculating machines, computers, message dispatchers, code scramblers, vending machines, games of skill, stock market boards, telephone switchboards, railroad freight siding memories, textile machines, etc.

Figure 7:
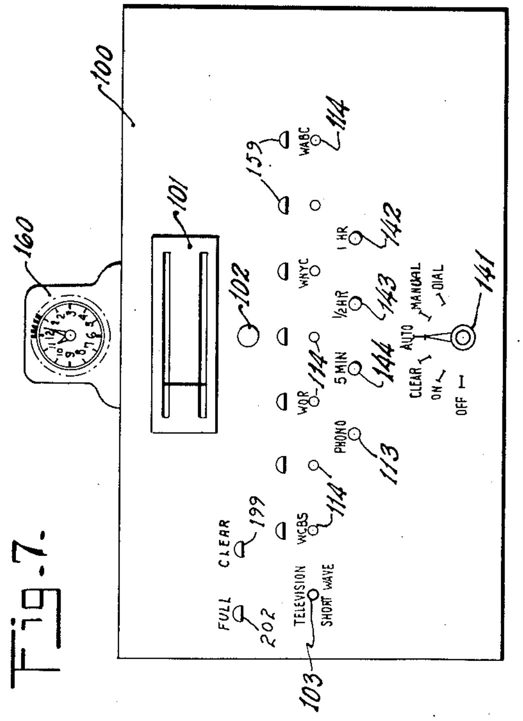
Fig. 7 is a view of a radio set adapted to be controlled by and having a panel adapted for use in the actuation of selector means embodying the invention.
Figure 8:
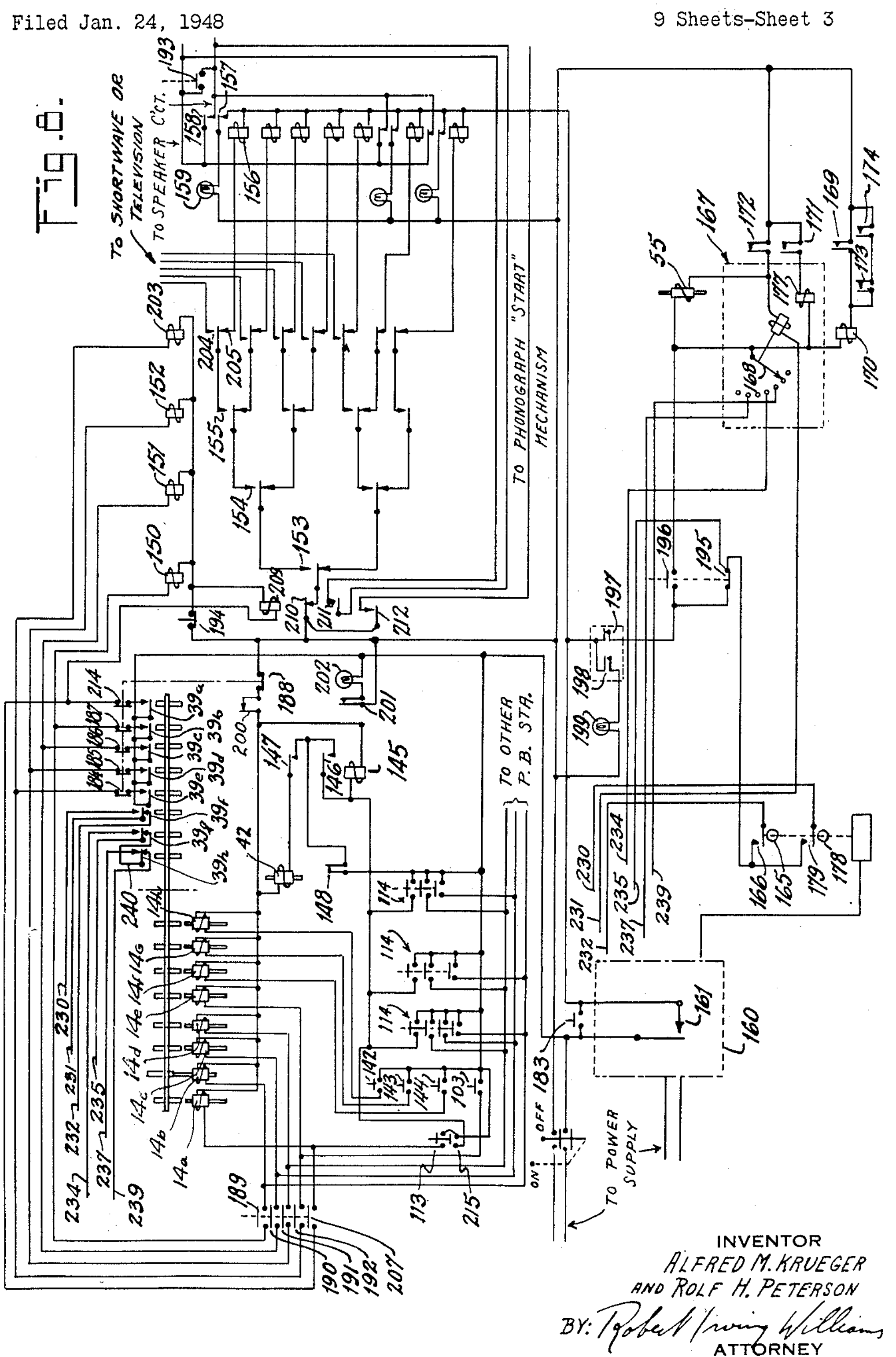
Fig. 8 is a diagram of one form of wiring arrangement and connections embodying the invention as applied to a radio such as illustrated in Fig. 7.

Figs. 7 and 8 show one form of actuation and control means for a standard radio console or cabinet as arranged for use in connection with the device of Figs. 1–5.

On a radio cabinet 100 there is provided a radio dial 101, a dial knob 102, a shortwave or television push-button 103, and a phonograph button 113. Station buttons 114 are provided. A selector switch 141 has six positions, namely "Off," "On," "Clear," "Automatic," "Manual," and "Dial." The "Off" position shuts the set off. The "On" position energizes the equipment. The "Clear" position automatically clears signals recorded upon the memory unit 20. The "Automatic" position places the set under the control of the memory unit 20. The "Manual" position places the set under the control of the operator for push-button control. The "Dial" position permits the manual dialing of the various stations. Time limit buttons 142 for programs lasting an hour, 143 for programs lasting a half-hour, and 144 for programs lasting five minutes are provided. When the selector switch 141 is turned to "Automatic" the unit 20 will be shifted every fifteen minutes unless one of the buttons 142, 143, or 144 are pressed. The exemplified circuits include a relay 145 having holding contacts 146 and 147 and a stroke contact 148. There are provided relays 150, 151, and 152 having contacts 153, 154, and 155, respectively, adapted to energize a relay 156 having contacts 157 and 158 adapted to energize an indicating light 159. A clock 160 is provided with contact 161, a clock cam 165 having a contact 166, and stepper switch 167 having an arm 168. A stroke contact 169 is provided to energize a relay 170 having contacts 171 and 172 and a holding contact 173. Solenoid 55 is dependent upon contact 172 and operates stroke contact 169 and a stroke contact 174 as indicated in Fig. 3. Associated with the stepper switch 167 is a release coil 177. A five-minute cam 178 has a contact 179. Selector switch contacts 184—188 and 214 are provided for automatic operation, and the contacts 189—192 and 207 for manual operation. Contacts 194, 195, and 196 are provided for the automatic clearing operation. A limit switch having contacts 197 and 198, the latter controlling an indicating light 199, is provided on the frame 10 as indicated in Figs. 2 and 7, for operation by the arm 12. A limit switch having contacts 200 and 201, the latter controlling a light 202, are provided on the frame 10 as indicated in Figs. 2 and 7, for operation by the arm 12. A relay 203 with contacts 204 and 205 is provided for transferring the selected circuit from a radio channel to a television or shortwave channel. For automatic phonograph operation switch 39*a* energizes a relay 209 having contacts 210, 211, and 212.

From switch 39*f* an "open" lead 230, a common lead 231, and a "closed" lead 232 run. From a switch 39*g* an "open" lead 234, a common lead 235, run. From switch 39*h* an "open" lead 237, and a "closed" lead 239 run. For the sake of simplicity in the drawings these leads are discontinuous being broken at the upper left hand portion of Fig. 8 and are resumed in the lower left hand corner of Fig. 8. A jumper 240 connects the lever arm of switch 39*h* with the "closed" contact of switch 39*g*.

Assuming that the selector switch is in the "Automatic" position and clock 160 has its contact 161 closed, the operation for the program preselection is as follows:

For an hour program the hour button 142 is depressed and then a station is selected by operating any button 114. For a half-hour program the half-hour button 143 is depressed and then a station is selected by operating button 114. For a five-minute program the five-minute button 144 is depressed and then a station is selected by operating any button 114. For a fifteen minute program a station push button 114 is momentarily depressed. Since the fifteen-minute program is the basis of the control circuit, this system will be described first.

Pressing any station button 114 energizes a particular combination of solenoids 14 of the selector means. Button 114 also energizes relay 145 closing its contacts 146 and 147, energizing solenoid 42 of the selector means. As the plunger 43 of solenoid 42 completes its stroke, it operates the stroke contact 148 to open and break the circuit thru contact 146 and contact 147 to solenoid 42. Solenoid 42 remains energized until any button 114 is released. The closing of the above-mentioned circuit also permits the momentary depressing of any button 114. This energizes relay 145 which is held energized thru its holding contact 146 and stroke contact 148 and simultaneously energizing solenoid 42 thru relay 145 contact 147. As the plunger 43 of solenoid 42 completes its stroke it operates the stroke contact 148 to open and break the circuit thereby de-energizing solenoid 42 and relay 145 and indexing takes place as described above.

The circuit is now ready for selection of the next station, and pressing of any push button station 114 will repeat the cycle as previously described, until the solenoid arm 12 rotates 360° in which position it operates the limit switch 200 to open and the limit switch 201 to close. When switch 200 opens, it prevents any further input signals to be recorded; while, when switch 201 closes, it energizes an indicating light 202 which indicates that memory unit 20 has been completely filled with preselected programs. It should be noted that the 360° rotation is not a limiting condition but is indicated only to show means for preventing the input of any further signals while the memory unit 20 is filled with selected programs. The invention in its broader aspects contemplates the provision of a wide number of continuous and non-continuous and repeating and non-repeating selector means or "memory devices" depending upon the needs of particular cases.

In the present instance, when a one-hour program is selected, button 142 is depressed before the station is selected, energizing solenoid 14*h* of the selector means the plunger of which strikes pin 30*h* of the row which is alined with the solenoids. Similarly for a half-hour program, push button 143 is depressed before the station is selected, energizing solenoid 14*g* of the selector means, which strikes pin 30*g*. Similarly for a five-minute program, push button 144 is depressed before the station is selected, energizing solenoid 14*f* of the memory device, the plunger of which strikes pin 30*f*.

Successive ones of a series of signals put in as described above may be taken off in the manner described below.

Assuming that switches 39*b*, 39*c*, and 39*d* are closed by contact with the disk pins which correspond to them, relays 150, 151, and 152 are energized, closing their respective contacts 153, 154, and 155. The closing of these contacts energizes relay 156 which turns on a pretuned radio circuit for a particular station or operates a tuning selector mechanism. Contacts 157 and 158 of relay 156 also close, energizing indicating light 159 and connecting the speaker into the radio circuit.

At the next fifteen-minute interval the clock cam 165 closes its contact 166, energizing the stepper switch 167 which moves its arm 168 to the next contact position "3" of the stepper switch 167. Cam 165 operates once every fifteen minutes. When arm 168 moves to position "3," it energizes solenoid 55 of the memory device. As the plunger 56 of solenoid 55 starts its stroke it closes its stroke contact 174 and as the plunger 56 of solenoid 55 completes its stroke, it operates contact 169 to close, energizinz relay 170. Relay 170 closes its contact 171 and 173 and opens its contact 172. The opening of contact 172 deenergizes solenoid 55 and indexing of the memory disk 20 takes place as described above. The closing of contact 173 holds relay 170 in the energized position thereby preventing the stepper switch 167 from being operated while the closing of contact 171 energizes the release coil 177 of the stepper switch 167. Operation of the release coil 177 results in arm 168 returning to its "Off" ("1") position. When solenoid 55 is deenergized its plunger 56 returns to its normal position thereby opening its stroke contacts 169 and 174. The opening of contact 174 de-energizes relay 170 which opens its contacts 173 and 171 thereby de-energizing the release coil 177. The closing of contact 172 energizes stepper switch 167 so that it steps to the next position "2" thereby setting the circuit for the next timing cycle.

For a one-hour program following a previous one (say the fifteen-minute program described above) the indexing operation is as follows:

Switch 39*h* of the memory device is closed by its corresponding pin 30*h*, while the station selection is made by switches 39*b*, 39*c*, and 39*d* and corresponding pins, as described previously. Switch 39*h* closes its contact with lead 237 and opens its contact with lead 239 transferring the fifteen-minute interval circuit to the one-hour interval circuit which operates as follows: The previous closing of contact 172 had operated the stepper switch 167 and had moved its arm 168 to contact position "2." At the beginning of each fifteen minute interval cam 165 operates its contact 166 to close. Cam 165 then will hold contact 166 closed for a certain length of time, namely, six, ten, or twelve minutes depending upon the design and construction of cam 165 and after this time interval the cam 165 will permit switch 166 to open. The cycle is repeated once every fifteen minutes. The purpose for holding contact 166 closed for a certain length of time is to permit the automatic transferring from a five minute program to a fifteen minute, a half-hour or one hour program without the selector mechanism loosing a time interval. For example: Since a radio program usually begins on the hour, half hour, or quarter hour, it can be readily seen that a five-minute program will use up five minutes of any other one-quarter hour, half-hour or one-hour program which begins at the same time as the five minute program. At the end of the five-minute program the indexing mechanism operates and "steps" the memory unit to the next selected program. In so indexing, the stepper switch 167 returns its arm 168 to the "Off" 1 position and the five-minute switch unit transfers the circuit from the five-minute cam 178 to the quarter-hour cam 165. Now, since cam 165 holds contact 166 closed for a definite period of time (which must be greater than five minutes), the stepper switch 167 is energized to move its arm 168 to the "2" position thereby setting up the correct timing cycle for the next preselected program. At the following fifteen-minute interval cam contact 166 closes, operating stepper switch 167 thereby moving arm 168 to the next "3" position. After a certain time cam contact 166 opens. At the second fifteen-minute period, cam contact 166 closes operating stepper switch 167, moving arm 168 to the next "4" position. After a certain time, cam contact 166 opens. At the third fifteen-minute interval cam contact 166 closes and the cycle described above repeats moving arm 168 to the next "5" position. Cam contact 166 opens at a certain interval of time. At the fourth fifteen-minute interval cam contact 166 closes, repeating the cycle described above, moving arm 168 to the next "6" position. This position is the one hour position. When arm 168 moves to "6" position, solenoid 55 of the memory device is energized. As the plunger 56 of solenoid 55 completes its stroke, it operates contact 169 to close which starts the indexing cycle of memory unit 20 as previously described. Similarly, relay 170 is energized closing its contacts 171 and 173 which starts the return of arm 168, first to the "Off" ("1") position, and then to "2" position, thereby setting the circuit for the next time interval. For a half hour program, the operation of the indexing and timing circuits is the same as described for the one-hour program except that switch 39*g* is operated by its corresponding pin and contact "4" of the stepper switch 167 mechanism is the position employed to start operation of the indexing mechanism. For a five-minute program, the operation of the indexing circuits is the same as described for the one-hour program except that switch 39*f* is operated by its corresponding pin. Switch 39*f*, by closing its contact with lead 230, transfers the timing circuits from the fifteen-minute cam 165 to the five-minute cam 178. Cam 178 closes its contact 179 once every five minutes thereby operating the stepper switch 167 in five minute intervals. Contact "3" of the stepper switch 167 mechanism is the position employed to start operation of the indexing mechanism. It should be noted that operation of the timing circuits is not limited to a stepper switch mechanism but may be a combination of relays or other electro-mechanical mechanisms. Also by varying the timing components and adding additional pins to the memory device any program may be preselected for any length of time, i. e., two, four, ten hours, etc. For "Manual" operation the selector switch 141 in Fig. 7 is placed in the "Manual" position. It should be noted that when the selector switch 141 is in the "Automatic" position it operates upon a latching bar on the pushbuttons 114 in such a manner as to make these buttons of the "momentary contact" type, while in the "Manual" position the latching bar operates to make push buttons 114 of the "maintained contact" type so that operation of any button 114 releases the previously operated button. This mechanism thereby permits the usage of the same push buttons 114 for either "Manual" or "Automatic" operation. When in the "Manual" position, the selector-switch contacts 184 to 188, inclusive, and 214 open, while contacts 189 to 192, inclusive, and 207 close, isolating the memory device signal-input mechanism from the circuit and transferring the control of relays 150, 151 and 152 directly to the pushbuttons 114. Operation of relays 150, 151, and 152 select the radio station desired as previously explained. It should be noted that the timing circuits and indexing mechanism of disk unit 20 of the memory device continue to remain under the control of cams 165 and 178 because the selector switch 141 contact 183 closes thereby by-passing contact 161 of clock 160. This contact 183 closes only when the selector switch 141 is either in the "Manual," "Dial" or "Clear" position. This permits the operator to change his program from a previously selected program to a new program simply by moving selector switch 141 of Fig. 7 from the "Automatic" to the "Manual" position and selecting the station desired. Meanwhile the timing mechanism continues to function and operate the indexing of disk unit 20 of the memory device for every five minute, fifteen minute, half hour or hour time interval, depending upon the previously preselected program. The operator can, at any time, switch from the "Manual" to the "Automatic" position of selector switch 141 of Fig. 7, and obtain immediately the previously preselected program that had been desired for that particular time. Having transferred back to the "Automatic" position the equipment continues to operate automatically, and selects, at the proper time interval, the program preselected previously prior to the switching to the "Manual" position. Turning the selector switch 141 of Fig. 7 to the "Dial" position opens contacts 184 to 192, inclusive, and 207 and 214, thereby removing the power supply from the signal input system of the memory device and from relays 150, 151, 152, 203 and 209 thus making the pushbutton stations 103, 113, 114, 142, 143, and 144 inoperative. Contact 193 closes the speaker circuit. However, the timing circuits and indexing mechanism of unit 20 of the memory device continue to function and remain under the control of cams 165 and 178. Switching from the "Dial" to the "Automatic" position, the equipment will operate and function similarly to the performance outlined above when the operator had switched from the "Manual" to "Automatic" position. Operation of the selector switch 141 of Fig. 7 to the "Clear" position will open contacts 184 to 195, inclusive, and 207 and 214 and close contact 196. Closing of contact 196 energizes the clearing circuit which operates as follows: Contact 196 closes, energizing solenoid 55 of the memory device. As the plunger 56 of solenoid 55 begins its stroke it operates contact 174 to close and when the plunger 56 completes its stroke it operates contact 169 to close. When contact 169 closes it energizes relay 170 which closes its contacts 171 and 173 and opens its contact 172. Contact 173 holds relay 170 energized. Contact 171 energizes the release coil 177 of stepper switch 167 so that arm 168 goes to the "Off" ("1") position. When contact 172 opens, it de-energizes solenoid 55 of the memory device, thereby operating the indexing mechanism as previously described. Contact 172 remains open until the plunger 56 of solenoid 55 opens contact 174 (situated at the beginning of the plunger stroke) thereby de-energizing relay 170 which opens its contacts 171 and 173 and closes its contact 172. When contact 172 closes, solenoid 55 is again energized and the cycle as described above repeats itself. This cycle of indexing continues automatically until all extending pins on unit 20 have been cleared. When all pins have been cleared, the solenoid arm 12 operates a limit switch 197 which automatically de-energizes the indexing mechanism for the disk-unit 20. Limit switch contact 198 closes, and energizes an indicating light 199 to indicate that disk-unit 20 is cleared of all extended pins. "Clear" switch contact 195 de-energizes the timing circuits during the clearing operation. It should also be noted that when any station is manually or automatically selected an indicating light 159 indicates the station that has been selected.

A standard "start-stop" clock mechanism is incorporated in the equipment in such a manner that the equipment may be started or shut-down automatically at any time and yet operate its preselected programs in the sequence originally selected. A timing device such as illustrated in the Robertson Patent 2,096,620 may be employed for this purpose, for example.

It should be noted that turning the selector switch 141 from its "Off" position to the "On" position will permit recording the selections on the memory unit 20 even though the radio circuits are shut down. The equipment is also so designed that television or short-wave stations may be manually or automatically selected for predetermined times. This equipment operates just as previously described, except that push button 103 designated "Television" or "Short-wave" is first operated. This energizes solenoid 14*e* to raise pin 30*e*. Then any of the station buttons 114 is pressed. These station buttons 114 now have an additional identification, namely, channel A, channel B, channel C, etc., signifying the television or short-wave station desired. When pin 30*e* comes in contact with arm 40*e* and closes operating switch 39*e*, it energizes relay 203, which closes its contacts 204 and opens its contact 205, thereby transferring the selecting circuit from the radio channel to a television or short-wave channel.

Relays 150, 151, 152, and 203 could be contacts operated directly by the memory unit pins.

It should be noted that this invention is readily adapted for use in connection with any number of desired stations.

The equipment is also so designed that the phonograph, record player, or other attachment may be manually or automatically operated for predetermined times. The equipment operates just as previously described, except that the additional push button 113 is added for a phonograph selection. The button 113 energizes solenoid 14*a* to operate pin 30*a*. If, before depressing button 113, a time button 142, 143, or 145 is depressed, the phonograph may be set up for five minutes, a half hour, or one hour operation and when only button 113 is operated the phonograph will play only for fifteen minutes. Also contact 215 of the "Phone" button energizes the indexing mechanism, previously described for solenoid 42 thereby permitting other selections to be recorded on the memory unit 20. When pin 30*a* comes in contact with and closes switch 39*a*, it energizes relay 209, which closes its contacts 211 and 212 and opens its contact 210.

The closing of contact 211 puts the speaker in the phonograph circuit, while contact 212 operates the phonograph starting mechanism thereby playing records. The opening of contact 210 prevents the radio or television channels from being operated while the phonograph is functioning. The phonograph can be selected for predetermined time playing of records, namely, five minutes, fifteen minutes, half hour, or one hour, etc. The same circuits operate during this timing cycle as operated for the radio or television selections.

Figure 9:
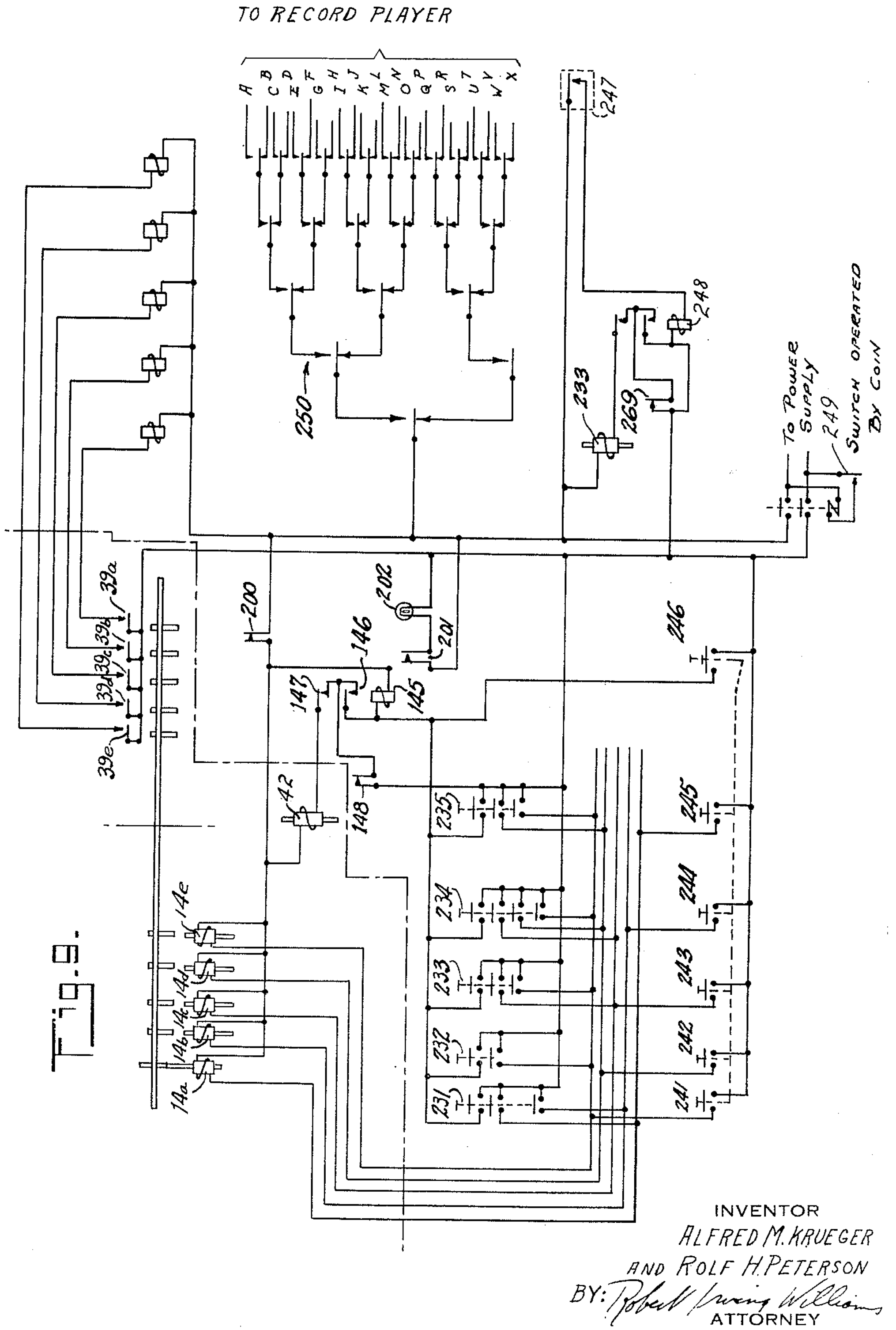
Fig. 9 is a similar view of electrical wiring and connections for use in the playing of records.

Fig. 9 illustrates an arrangement for utilizing a device of the character shown in Figs. 1–5 for the selective operation of a juke box or other record player. Two sets of push buttons 231–235 and 241–245 are exemplified. The former are individual-control buttons whereas the latter are pattern-control buttons. The sets of buttons may be used together as shown, or individual sets may be used, depending on the requirements of a particular case. Operations of the buttons 241–245 are controlled by a control button 246. There is provided a switch 247 adapted to be operated by the ordinary record-removing mechanism and a relay 248 similar to the relay 145 and controlled by this switch. A coin-controlled contact 249 is provided for juke-box use. As exemplified, there is shown a pyramid circuit 250 adapted for use in the playing of twenty-four records, A thru X, or the two sides of each of twelve records. Other parts are in general similar to those previously exemplified and are indicated by similar reference numerals. Only five solenoids 14, pins 30, and contact switches 39 are shown, it being possible either to utilize arms and disks containing only this number of elements or to use the construction exactly as shown in Figs. 1–5 with the other solenoids, pins, and switches idle.

In operations using buttons 241 thru 245, etc., solenoids 14*a* thru 14*e* are energized directly to push out their corresponding pins 30*a* thru 30*e*. Also these buttons energize the indexing circuit of solenoid arm 12 by energizing relay 145 to close its contacts 146 and 147. Buttons 231 to 235 may be operated merely by momentary depression, because relay 145 remains energized thru its contact 146. When contact 147 closes, it energizes solenoid 42, and the plunger at the end of its stroke operates switch 148 to open. The opening of switch 148 de-energizes solenoid 42 and relay 145 thereby causing the solenoid arm 12 to index, as previously described.

By pressing various combinations of the buttons 241–245, corresponding combinations of solenoids 14*a*–14*e* are energized as previously described. The buttons latch themselves in the closed position. Now the pressing of "Release" button 246 energizes relay 145 and sets up the indexing cycle of solenoid arm 12, as previously described. Also it trips the latch holding buttons 241–245 permitting these buttons to return to their normal position ready for the selection of a new record or record-side. Button 246 is of the momentary-contact type. The take-off switches 39*a* thru 39*e*, and their operation of the pyramid relays will be understood from the operations described above.

When the playing of a record is finished, the usual mechanism is actuated to remove the record from the turn-table of the juke-box, and it momentarily operates a switch 247 to close. The closing of this switch energizes a relay 248 similar to relay 145, thereby setting up an indexing cycle identical to that described for solenoid arm 12. When the device indexes, a new group of pins selectively operate switches 39*a* thru 39*e* to select a new record or a replaying of the same record as desired.

When the memory unit is completely filled with selections, solenoid arm 12 operates limit switch 201 to energize indicator light 202 which indicates that the memory unit is filled. Clearing the selections may be accomplished as previously described.

The equipment is set in operation when a coin is placed in the juke box, thereby connecting the equipment to the power supply.

Figure 10:
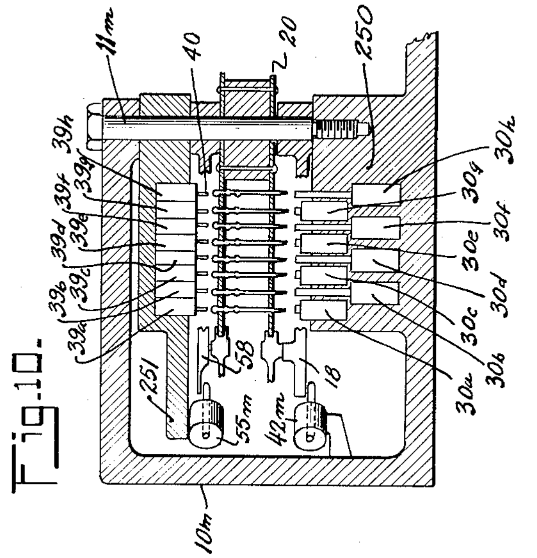
Fig. 10 is a view similar to Fig. 1 showing a modification.

As will be appreciated, a wide number of modifications may be made in the constructions exemplified without departing from the spirit and scope of the invention. For example, the parts which are stationary and the parts which are movable may be varied, so long as general relative movability is maintained. One such modification is exemplified in Fig. 10 wherein the solenoids 30*a*–30*h* are mounted on a portion 250 of a frame 10*m*, which is otherwise generally similar to the frame 10; and a solenoid 42*m*, corresponding to the solenoid 42, is likewise mounted on the frame 10*m*. A disk unit 20 similar in all respects to that shown in Fig. 1 is provided, and above it switches 39*a*–39*h* carrying wipers 40*a*–40*h* are mounted on an arm 251 which is rotatably carried on a shaft 11*m* and which carries a solenoid 55*m* corresponding to the solenoid 55. Arms 13 and 58 and pawl, spring, and pin arrangements are provided as in the case of the construction of Figs. 1–5.

Figures 11, 12, 13, 14:
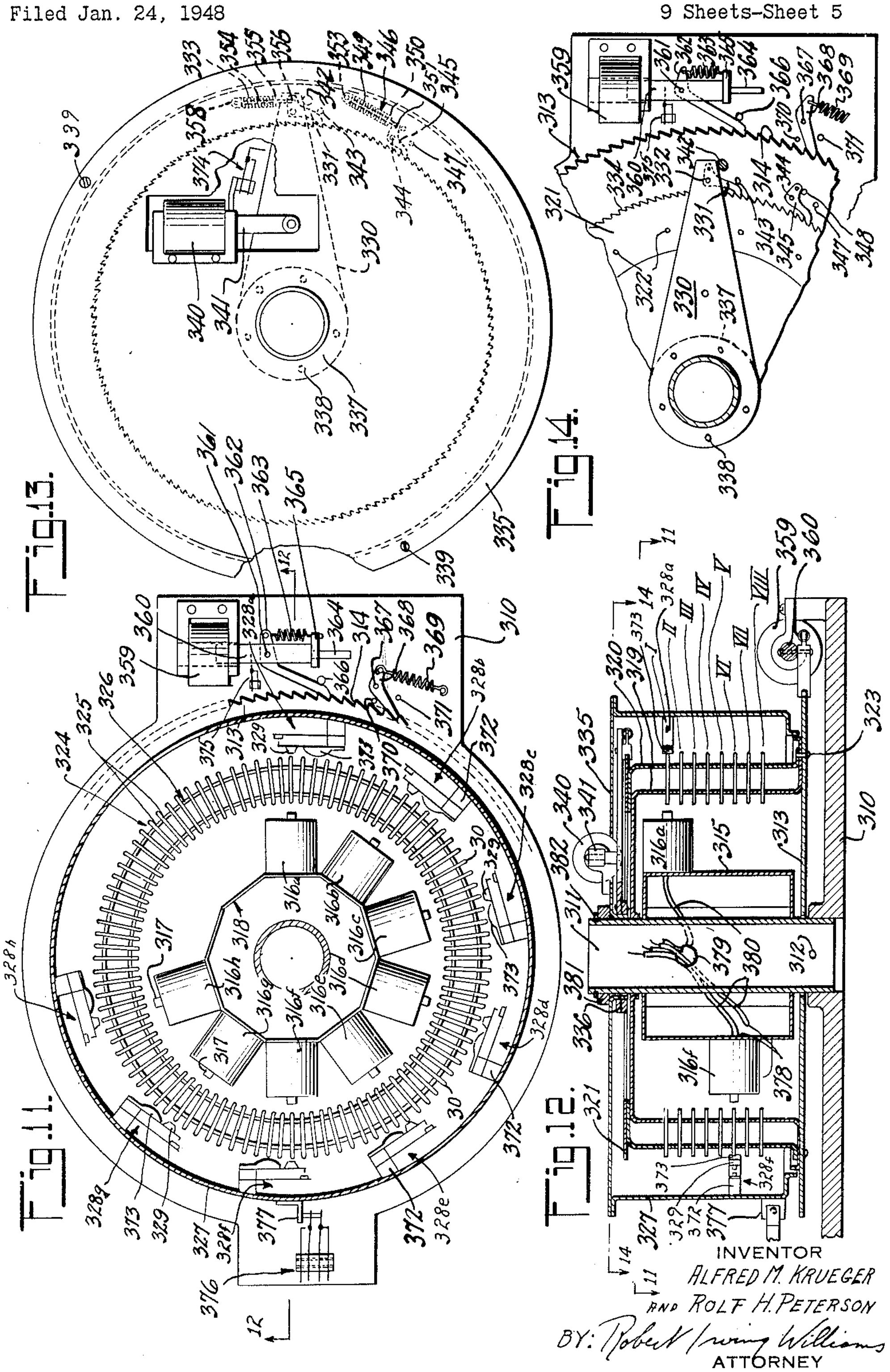
Fig. 11 is a horizontal sectional view of another modified form of memory device construction.
Fig. 12 is a vertical section along the line 12—12 of Fig. 11.
Fig. 13 is a fragmentary top view of the device of Figs. 11 and 12.
Fig. 14 is a fragmentary horizontal section along the line 14—14 of Fig. 12.
Figure 16:
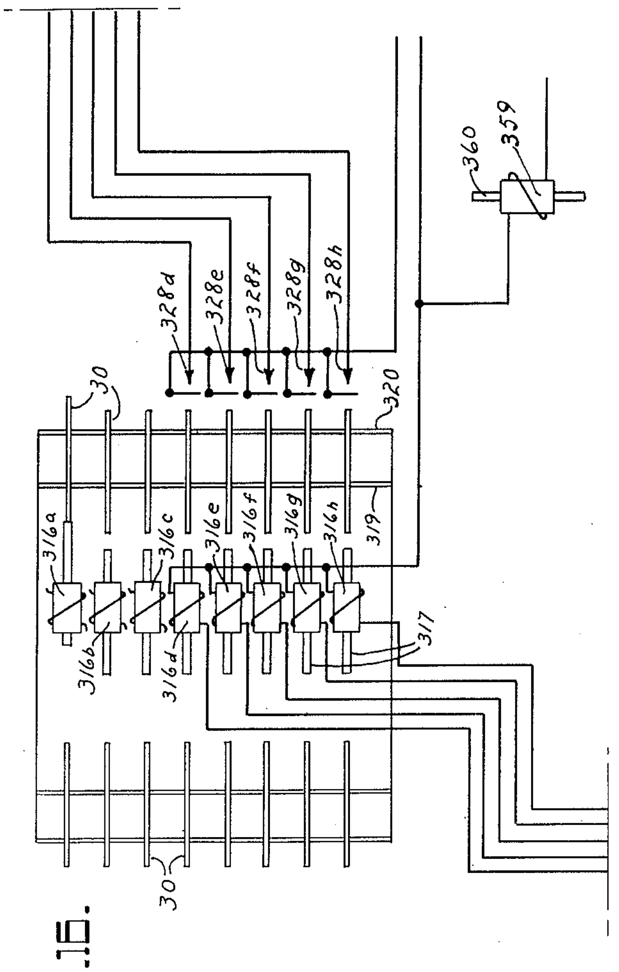
Fig. 16 is a fragmentary showing of a circuit arrangement adaptable for use with the modification of Figs. 11–15.

In the form of construction shown in Figs. 11–14 there is provided a frame 310 to which a vertical tubular shaft 311 is fixedly secured and registered by a pin 312. Rotatably mounted on the lower part of the shaft 311 is an indexing disk 313 on the periphery of which are ratchet teeth 314. Attached to shaft 311 is a bracket 315 on which are spirally mounted a plurality of solenoids 316 having radially movable plungers 317. Eight solenoids designated respectively as 316*a*, 316*b*, 316*c*, 316*d*, 316*e*, 316*f*, 316*g*, and 316*h* are provided in the present instance. Around the solenoid assembly 318 is an inner drum 319, an outer drum 320 fastened together and to a ring 321 by rivets 322 at the top, and at the bottom the inner drum 319 and the outer drum 320 are fastened together and to indexing disk 313 by rivets 323. The drums 319 and 320 are formed with alined rows 324 of holes 325. Drum assembly 326 has alined holes 325 which are equally spaced circumferentially in a number of planes. On the inner surface of a drum 327 there are mounted switches 328*a*, 328*b*, 328*c*, 328*d*, 328*e*, 328*f*, 328*g*, and 328*h* which are also disposed in a number of planes. In this case there are eight planes numbered I, II, III, IV, V, VI, VII, and VIII, with a hundred holes in each plane. In each hole there is a pin 30. Solenoid 316*a*, with its plunger 317, wiper 329 and switch 328*a* all lie in plane I, and operate only on the pins in plane I. The corresponding *b* numbers (316*b* and 328*b*) all lie in plane II and operate only on the pins in plane II. In the same manner the *c* group correspond to plane III. Each group (*a*, *b*, *c*, *d*, *e*, *f*, *g*, *h*) can "start" at any pin in its plane. When the drum is completely cleared each group (*a* thru *h*) must be in the "start" relationship. As shown in Fig. 11 the "start" relationship is with solenoid, pin and wiper in line, (the circuit arrangement of Fig. 9 with the portion in the upper left hand corner which is set off by dot-and-dash lines replaced by the circuit diagram of Fig. 16).

Although there are one hundred pins in a plane, only ninety-eight can be set at any time, because there are always two pins in the region of the re-set cam or inclined surface 373.

Figure 15:
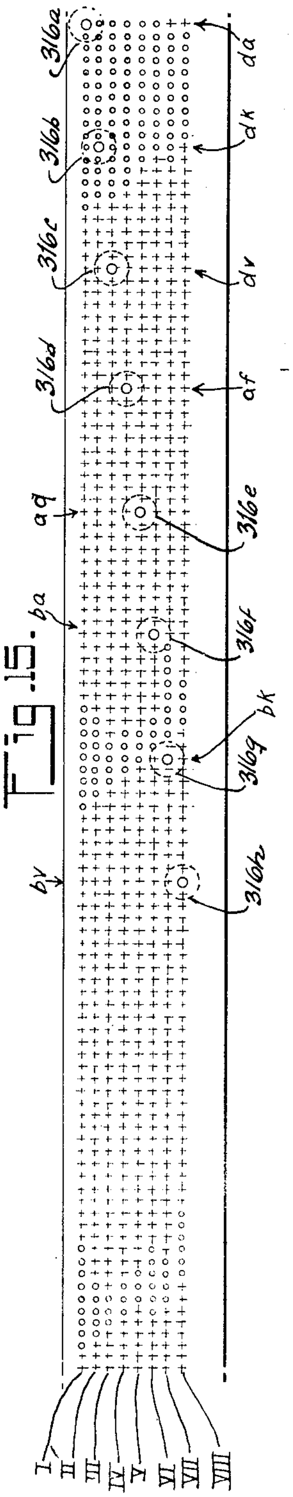
Fig. 15 is a schematic view of the pin arrangement.

Each pair of holes contains a pin 30, as described previously, which is movable. In each row 324 there are provided in the present instance, eight pins 30 so arranged that the pins of any row may be alined with the plungers 317 of the spirally-mounted solenoids 316. The pins in a spiral row or set, as shown circled on the expanded view Fig. 15, are in successive planes from I thru VIII and in series *da*, *dk*, *dv*, *af*, *aq*, *ba*, *bk* and *bv* respectively. Around the drum assembly 326, is another drum 327 on the inner surface of which are spirally mounted a plurality of switches 328 carrying radially extending cam surfaces 329 of such length that they will contact a pin 30 which is in an outward position, but not a pin 30 which is in an inward position. In the present instance, the switches are so arranged that their cam surfaces 329 will be alined with the circled pins (Fig. 15) of any row which may be brought into position with cam surfaces 329. Above the drum assembly 326 is a movable arm 330 which moves around shaft 311. Above arm 330 is a disk 335, the central portion of which is formed into a tubular section 336, so that the inner surface forms a bearing around the shaft 311 and the outer surface forms a bearing for the arm 330. On arm 330 a spacer collar 337 is fastened by rivets 338. The peripheral portion of disk 335 is fastened to the upper flange of drum 327 by detachable fastenings 339. Disk 335 carries a solenoid 340 having a plunger 341 attached to arm 330. Pin 342 is secured to disk 335 and extends downward to form a stop for arm 330 in its clockwise stroke movement relative to drum 327. Pin 343 is attached to disk 335 and extends downward to engage the outer surface of pawl 331. Arm 330 carries near its outer end a pawl 331 pivoted at 332. A spring 333 serves to push the pawl 331 against the notched periphery of the ring 321 and at the same time partially withdraws the plunger 341 from a solenoid 340 and holds arm 330 against a stop 342. The periphery of the ring 321 is shaped in the form of a ratchet by the provision of sawtooth notches 334. A pin 343 acts as a stop to hold the pawl 331 in a notch 334 and serves to positively prevent the pawl 331 from being moved outwardly until the plunger 341 moves the arm 330 and the pawl 331 in counterclockwise direction (Fig. 13) relative to the drum assembly 326. Clockwise movement of the unit 326 with respect to outer drum 327 is thus effectively prevented.

There is pivoted at 344 on disk 335 a pawl 345. A spring 346 serves to hold the pawl 345 against the notched periphery of ring 321. Pins 347 and 348, attached to disk 335 and extending downwardly, serve as stops to limit the amount of travel of pawl 345. The spring 346, as shown, is a compression type spring guided by a central shaft 349 on which is secured a collar 350. One end 351 of shaft 349 is pivoted on pawl 345 while the other end is guided in a lug 353 which is fastened to disk 335. A spring 333, as shown, is a compression-type spring guided by a central shaft 354 on which is secured a collar 355. One end 356 of shaft 354 is pivoted on pawl 331 while the other end is guided in the lug 358 which is fastened to disk 335.

On the top surface of the base of the frame 310 there is mounted a solenoid 359 adapted when energized to draw in a plunger 360 on which is pivoted at 361 a pawl 362. A spring 363 serves to normally hold this pawl 362 in place and to partially withdraw the plunger 360 from solenoid 359. The outer end 364 of plunger 360 is guided by a lug 365 which is fastened to the base of the frame. Lug 365 serves also to limit the outward travel of the plunger 360. The pin 366, fastened to base and extending upward, acts as a stop to hold the pawl 362 against a ratchet tooth 314. This pin 366 serves to positively prevent the pawl 362 from being moved outwardly until the plunger 360 carries the pawl 362 towards the solenoid 359. Clockwise movement of disk 313 (and the drum assembly 326 attached thereto) with respect to frame 310 is thus effectively prevented. There is pivoted at 367, on the upper side of the frame 310, a pawl 368 which is normally held in place by a spring 369. Pins 370 and 371, attached to frame 310 and extending upward, serve as stops to limit the amount of travel of pawl 368.

As will be seen from Fig. 11 there are attached to switch bodies 372 inclined surfaces 373. The outer limit of each inclined surface can contact a radially-extended pin 30 and the inner limit of the inclined surface can pass a pin 30 which is in a radially inward position. During a stepping action of drum 327 relative to drum 326; i. e., for taking off of next signal, the inclined surface will move over a pin 30. If that pin is in an outwardly extended position it will be cammed inwardly thereby and re-set for a new signal. A limit switch 374 is mounted on disk 335. Limit switches 375 and 376 are mounted on frame 310.

Lug 377 is fastened to the outer side of drum 327 and extends outward to actuate switch 376 when drum 327 and base are in the relative position shown in Fig. 11. This occurs only when the device is clear of signals.

Hole 378 in bracket 315 and hole 379 in tube shaft 311 are employed for passage of leads 380 from solenoids 316*a*, 316*b*, 316*c*, 316*d*, 316*e*, 316*f*, 316*g*, and 316*h* to outside of device.

Collar 381 is a free sliding fit on shaft 311 that holds the entire assembly together and this collar is held in place by snap ring 382.

It should be noted that solenoid 359, lug 365, pin 366, pawl 368, pins 370 and 371, etc., fastened on frame 310 are so placed that when the parts are in the position shown there will be a circled pin in line with each solenoid 316*a*, 316*b*, 316*c*, 316*d*, 316*e*, 316*f*, 316*g*, and 316*h*.

Upon the energization of selected ones of the solenoids 316 (e. g. solenoids 316*b*, 316*d* and 316*e*) the plungers 317 thereof will be radially extended outward and will move corresponding pins 30*dk*, 30*af* and 30*aq* which are directly in line with the plungers. At the completion of the incoming signal the selected solenoids 316 are de-energized and the solenoid 359 is energized to cause a stepping or "indexing" of the drum assembly 326 with respect to frame 310. This results from the movement of the plunger 360 against the pawl 362 in a direction which will stretch spring 363. The pawl 362 is carried from one notch to the next. During this action the disk 313 is prevented from moving in a counterclockwise direction relative to the frame 310 by the holding pawl 368. When the solenoid 359 is de-energized, the spring 363 pulls the plunger 360 and the pawl 362 together until the stop 365 contacts the plunger 360. During this action the pawl 368 ratchets to next tooth 314. The pin 366 now serves to hold the pawl 362 in place and to lock disk 313 and the frame 310 together. This completes an index cycle of drum assembly 326, and the selector means is ready to receive another coded signal or pattern of signals. These can be put in at any time after the row of pins has been positioned, and until the drum assembly 326 is filled with signal patterns.

Signals may be taken off either after or during the putting in of signals and until all the signals which have been put in are taken off. In taking off of signals the cam surfaces 329 serve to operate the switches 328*a*, 328*b*, 328*c*, 328*d*, 328*e*, 328*f*, 328*g*, and 328*h*, wherever there are pins 30 in a radially extended position. After a signal has been picked off and sent out, the taking off of the next signal is initiated by the energization of solenoid 340 to move an arm 330 in a counterclockwise position (Fig. 13) to index the pawl 331 one notch 334 against the spring 333 to move the arm 330 in a new position with respect to the ring 321. During this action, solenoid 340 and arm 330 are drawn together and disk 335 tends to rotate in a clockwise direction since solenoid 340 is attached to disk 335. Disk 335 is prevented from moving in a clockwise direction by pawl 345 and pins 347 and 348 hence arm 330 must move one notch 334 in a counterclockwise direction thereby compressing spring 333. When the solenoid 340 is de-energized, spring 333 pushes the drum 327 in a counterclockwise direction until stop pin 342 contacts the arm 330, thus indexing the drum 327 in a counterclockwise direction. This may be repeated as often as desired as long as settings have been imparted to a sufficient number of rows of the pins 30.

It can be seen that when "indexing" occurs for drum 326 for input of signals and no signals are being taken off, the drum 327, as well as the arm 330 and its related stepping mechanism are carried along with the drum 326. This locking feature is provided by pawl 331 in conjunction with pin 343, as previously described.

Figure 17:
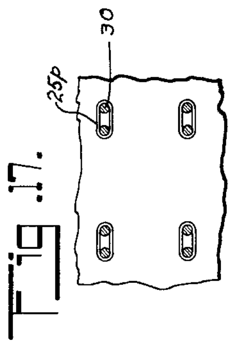
Fig. 17 shows a modified form of pin-receiving hole.

Instead of round holes, elongated holes having about the same width as a pin are advantageous in certain instances. One such hole 25*p* is shown in Fig. 17.

Figures 18, 19, 20:
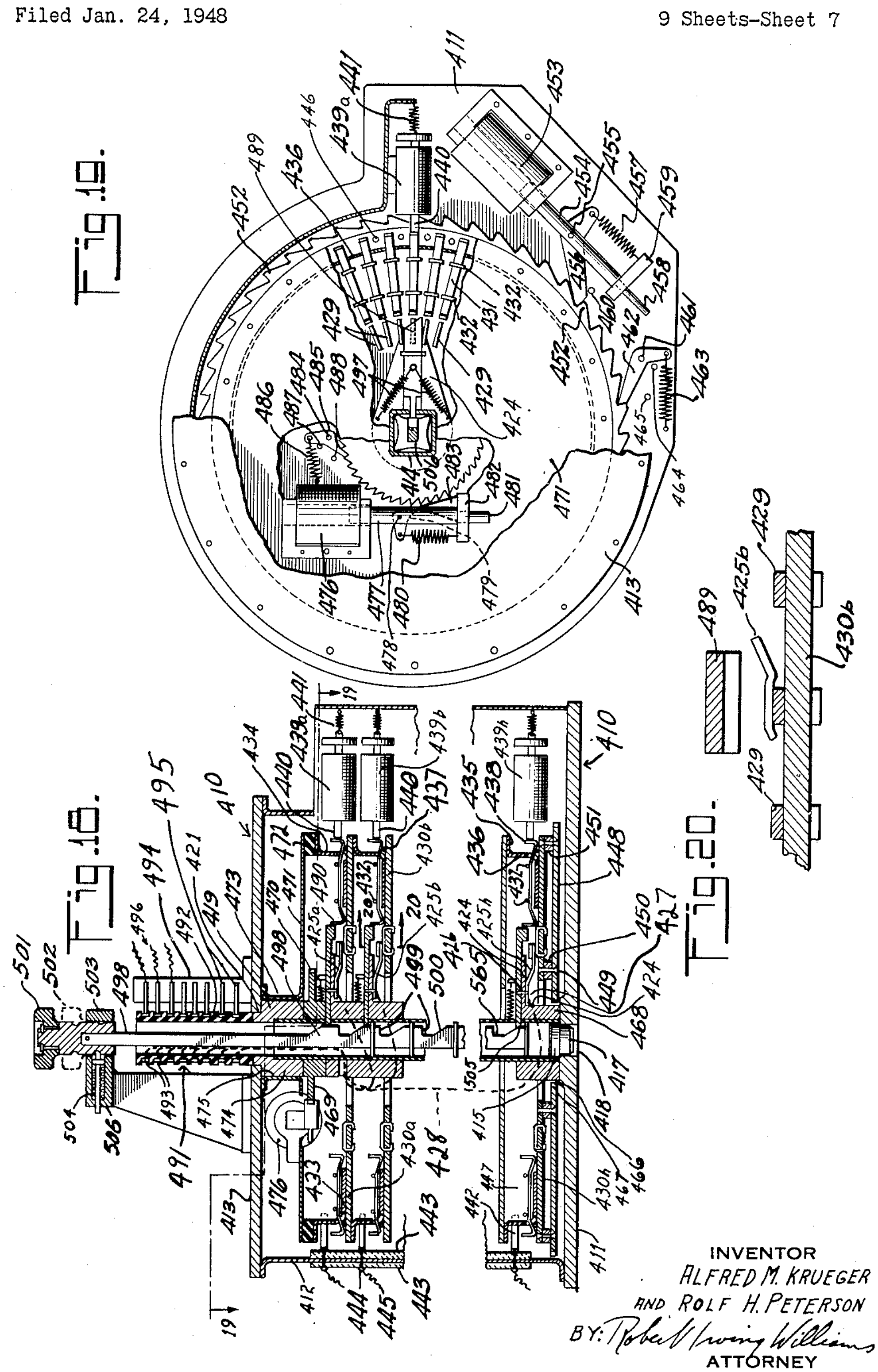
Fig. 18 is a vertical sectional view of another modification.
Fig. 19 is a horizontal sectional view on the line 19—19 of Fig. 18.
Fig. 20 is an enlarged detail view of a portion thereof along the line 20—20 of Fig. 18.

The invention in its broader aspects contemplates the use of a wide variety of structural variations in the memory devices employed. In Fig. 18 there is provided a frame 410 comprising a base 411, a support 412, and a top plate 413. The frame rotatably carries a hollow central shaft 414 the body of which is rectangular in cross section, and at the bottom of which is a plug 415 having a rounded lower end 417 fitting into a hole 418 in the base 411. The upper end of the shaft is provided with a collar 419 rotatably set in a circular opening 421 in the top plate 413. The shaft carries switch arms 424 of which eight, indicated 424*a*, 424*b* . . . 424*h*, are utilized in the present instance. These switch arms are made of non-conducting material and are adapted to be interchangeably slid on the shaft in assembly to rotate with the shaft. Wipers 425*a*, 425*b* . . . 425*h* are resiliently mounted on arms 424*a*, 424*b* . . . 424*h* by rivets 426. At the riveted end 427 of each wiper 425 an insulated wire 428 is securely fastened. Wiring leads 428 run from the wipers 425*a*, 425*b* . . . 425*h* upwardly thru the hollow shaft 414. The wipers are arranged to make contact with one of a number of fixed contacts 429. Contacts 429 are circumferentially mounted and secured to disks 430*a*, 430*b* . . . 430*h* which are made of insulating material. Radially outward from each of contacts 429 there is mounted a slidable element 431 which is guided in its motion by parts 432. Slidable element 431 also slides on and makes contact with a disk ring 433. The outer edge 434 of disk ring 433 is formed into a spacer ring, being flared out with a flange 435. Clearance holes 436 are cut into disk ring 433 and its outer edge 434 in such a manner to permit slidable elements to pass freely. Part 437 keeps the sliding element 431 in non-operative position until the element 431 is pushed over part 437 by means to be described later. Part 431 is also prevented from being pushed into the path of wiper 425 of switch arm 424 since its tip strikes against the spacer ring 434 of disk ring 433.

Attached to support 412 are a plurality of solenoids 439 having radially movable plungers 440. Three are shown in the present instance. The plungers 440 are alined with a sliding element 431 so that when the solenoid 439 is energized the plunger 440 pushes the element 431 radially inward to make contact with fixed contact 429. Springs 441 attached to plungers 440 and to support 412, act to return the plungers to their normal position after the solenoids 439 are de-energized. Brushes 442 are mounted on support 412 and insulated therefrom by insulating parts 443. The brushes are held in place by rivet 444. The outer end of rivet 444 has firmly secured thereto a flexible connector 445. Each brush 442 contacts one of spacer rings 434. Each flange 435 is secured to the previous insulating disk 430 at points 446 between sliding elements 431 so that there is no electrical connection between the parts 433. The assembly of these units 447 comprising insulating disks 430*a*, 430*b* . . . 430*h* and 435 form a combination disk and drum type of memory device.

At the bottom between disk 430*h* and the base 411 is an indexing disk 448. Disk 448 is secured to disk 430*h* by fastening devices 449, and properly spaced from 430*h* by spacing rings 450 and 451. On the periphery of disk 448 are ratchet teeth 452. On the top surface of base 411 there is mounted a solenoid 453 adapted, when energized, to draw in a plunger 454 on which is pivoted at 455 a pawl 456. A spring 457 serves to normally hold this pawl 456 in place and to partially withdraw the plunger 454 from solenoid 453. The outer end 458 of plunger 454 is guided by a lug 459 which is fastened to base 411. Lug 459 serves also to limit the outward travel of the plunger 454. A pin 460, fastened to base 411 and extending upward, acts as a stop to hold the pawl 456 against a ratchet tooth 452. This pin 460 serves to positively prevent the pawl 456 from being moved outwardly until the plunger 454 carries the pawl 456 towards the solenoid 453. Clockwise movement of disk 448 (and of disk-drum unit 447 attached thereto) with respect to base 411 is thus effectively prevented. There is pivoted at 461, on the upper side of 411, a pawl 462 which is normally held in place by a spring 463. Pins 464 and 465, attached to base 411 and extending upward, serve as stops to limit the amount of travel of pawl 462. In the center of indexing disk 448 is a hole 466 the inner surface 467 of which can rotate around the collar-like portion 468 of 424*h*. This forms a bearing for the lower end of the drum-disk unit 447.

On the central shaft 414 and between switch arm 424*a* and collar 419 is the indexing disk 469 on the periphery of which are the ratchet teeth 470. Since this disk 469 is placed on the rectangular section shaft 414, the disk 469, shaft 414 and arms 424*a*, 424*b* . . . 424*h* will rotate together. Above indexing disk 469 is the plate 471 which is secured to the flange 435*a* and insulated therefrom by a spacer ring 472. The inner portion 473 of plate 471 is bent upward to form a bearing surface 474 around the collar 419. The flange 475 rides against the under surface of top plate 413. On the top surface of plate 471 there is mounted a solenoid 476 adapted when energized to draw in a plunger 477 on which is pivoted at 478 a pawl 479. A spring 480 serves normally to hold this pawl 479 in place and to partially withdraw the plunger 477 from solenoid 476. The outer end 481 of plunger 477 is guided by a lug 482 which is fastened to plate 471. Lug 482 serves also to limit the outward travel of the plunger 477. The guide 483 fastened to lug 482 and extending toward the pawl 479 acts as a stop to hold pawl 479 against a ratchet tooth 470. This guide 483 serves to positively prevent the pawl 479 from being moved outwardly until the plunger 477 carries the pawl 479 towards the solenoid 476. Counterclockwise movement of indexing disk 469 with respect to plate 471 is thus effectively prevented. There is pivoted at 484, on the under side of plate 471, a pawl 485 which is normally held in place by a spring 486. Pins 487 and 488, attached to plate 471 and extending downward, serve as stops to limit the amount of travel of pawl 485.

In order to clear the settings, cam arms 489 are provided to act against the inner portions 490 of elements 431. When a switch arm 424 steps, the cam action pushes an inwardly extended element 431 in a radially outward direction, thereby resetting the element 431 for a new signal. This action occurs only during the stepping of a switch arm 428 and only upon that element 431 from which it is stepping.

Upon the energization of selected ones of the solenoids 439*a*, 439*b* . . . 439*h* the plungers 440 thereof will be radially extended inward and will move corresponding slidable elements 431 which are directly in line with the plungers. At the completion of the incoming signal the selected solenoids 439 are de-energized and the solenoid 453 is energized to cause a stepping or "indexing" of the drum-disk assembly unit 447 with respect to base 411. This results from the movement of the plunger 454 carrying the pawl 456 and stretching the spring 457. The pawl 456 is carried from one tooth 452 to the next. During this action the disk 448 is prevented from moving in a counterclockwise direction relative to base 411 by the holding pawl 462. When the solenoid 453 is de-energized, the spring 457 pulls the plunger 454 and the pawl 456 together until the lug 459 contacts the plunger 454. During this action the pawl 462 ratchets to the next tooth 452. The pin 460 now serves to hold the pawl 456 in place and to lock disk 448 and the base 411 together. This completes an index cycle of drum-disk assembly 447, and the selector means is ready to receive another coded signal or pattern of signals. These can be put in until the drum-disk assembly unit 447 has rotated thru 360°; or, at any time after the sliding elements have been positioned.

Signals may be taken off either after or during the putting in of signals and until all the signals which have been put in are taken off. In the taking off of signals the wiper 425*a*, 425*b*, . . . 425*h* in contact with contact 429 serves to complete the circuit wherever there are slidable elements 431 in a radially inward position against contact 429. Otherwise the circuit is open. The taking off of the next signal is initiated by the energization of solenoid 476 to move arms 424*a*, 424*b* . . . 424*h* in a counterclockwise direction (Fig. 19). When the signal comes for the stepping of the wiper arms 424*a*, 424*b* . . . 424*h* to the next pattern of signals stored in the memory unit, solenoid 476 is energized to cause a stepping or "indexing" of the central shaft 414 with respect to plate 471. This results from the movement of the plunger 477 carrying the pawl 479 and stretching the spring 480. The pawl 479 is carried from one tooth 470 to the next. During this action the disk 469 is prevented from moving in a clockwise direction relative to the plate 471 by the holding pawl 485. When the solenoid 476 is de-energized, the spring 479 pulls the plunger 477 and the pawl 479 together until the lug 482 contacts the plunger 477. During this action the pawl 485 ratchets to the next tooth 470. The guide 483 now serves to hold the pawl 479 in place and to lock disk 469 and the plate 471 together. This completes an index cycle of the central shaft 414, and the selector means is ready to take off another coded signal or pattern of signals. These can be taken off until the central shaft 414 has rotated thru 360°; or, at any time prior to making a complete rotation.

As will be appreciated the invention is readily adaptable to continuous operation in a single direction. To this end there is provided in the present instance a slip-ring unit 491 on the upper end of the shaft 414. The slip-ring unit 491 comprises an insulating body 492 and carries slip rings 493, to which the ends of leads 428 are connected. Insulating arm 494 mounted on the top plate 413 carries wiper arms 495 contacting slip rings 493 from which conductors 496 lead off.

It is also desirable that the signals which are put into a series of rows be repeatable, and to this end the device of Figs. 18–20 embodies means whereby the clearing cam 489 may be retracted to an inoperative position when desired. The cam 489 is urged rearwardly by springs 497 against the surface of a vertical plunger 498 which is formed with recesses 499 and cam surfaces 500 beneath the recesses. At the upper end of the plunger 498 is a knob 501 notched at 502 and 503 for the reception of a spring-pressed detent 504 when the knob 501 is in its uppermost position, as shown in full lines in Fig. 18, the clearing cams 489 are all held outwardly as shown in Fig. 18, and in full lines in Fig. 19. In this position the cam 489 operates to clear at each revolution. However, when the notch 501 and the plunger 498 are in their lowermost position the notches 499 are in line with the inner ends 505 of the cam arms 489 so that the cam arms 489 may be drawn inwardly by the springs 497. When further repetition becomes undesirable, the notch 501 is pulled inwardly with the result that the cams 489 are thrust outwardly by the cam surfaces 500. The plunger 498 forms a unit with the shaft 414 in the rotation thereof being held firmly therein by insulating plates 506.

Figure 21:
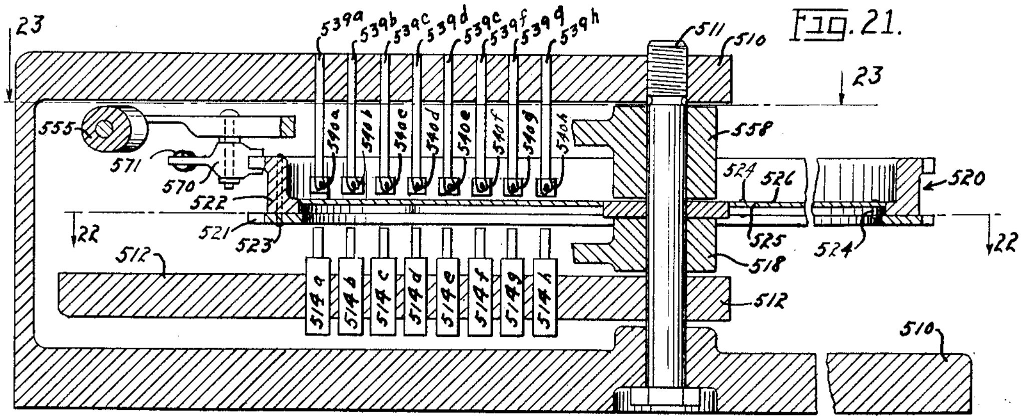
Fig. 21 is a fragmentary vertical sectional view of still another modification.

In the form of construction shown in Fig. 21 there is provided a frame 510 to which a vertical shaft 511 is fixedly secured. Rotatably mounted on the lower part of the shaft 511 is a supporting arm 512 carrying a plurality of magnetizing units 514. Eight magnetizing units designated respectively as 514*a*, 514*b*, 514*c*, 514*d*, 514*e*, 514*f*, 514*g*, and 514*h* are provided in the present instance. Above the supporting arm 512 is an indexing arm 518 which is rotatably mounted on the shaft 511 independently of the arm 512. Above the arm 518 is a memory unit 520, which is composed of a ring 521 and a ribbed disk unit 522 fastened together by fastening device 523, rotatably mounted on the shaft 511 and is freely movable with respect to the arms 512 and 518. Fastened to the ribbed disk 522 by device 524 is a disk 525 composed of non-magnetic material coated with magnetic recording media 526 of any of the various types commonly used for the imposition of reversible alteration of magnetic qualities of portions thereof. On the upper portion of the frame 510 are a plurality of pickups 539 carrying downwardly-extending pick-up heads 540 which are close enough to the magnetic media 526 so that these heads 540 will be influenced by any changes of the magnetic characteristics of the magnetic media 526.

Figures 22, 24, 25:
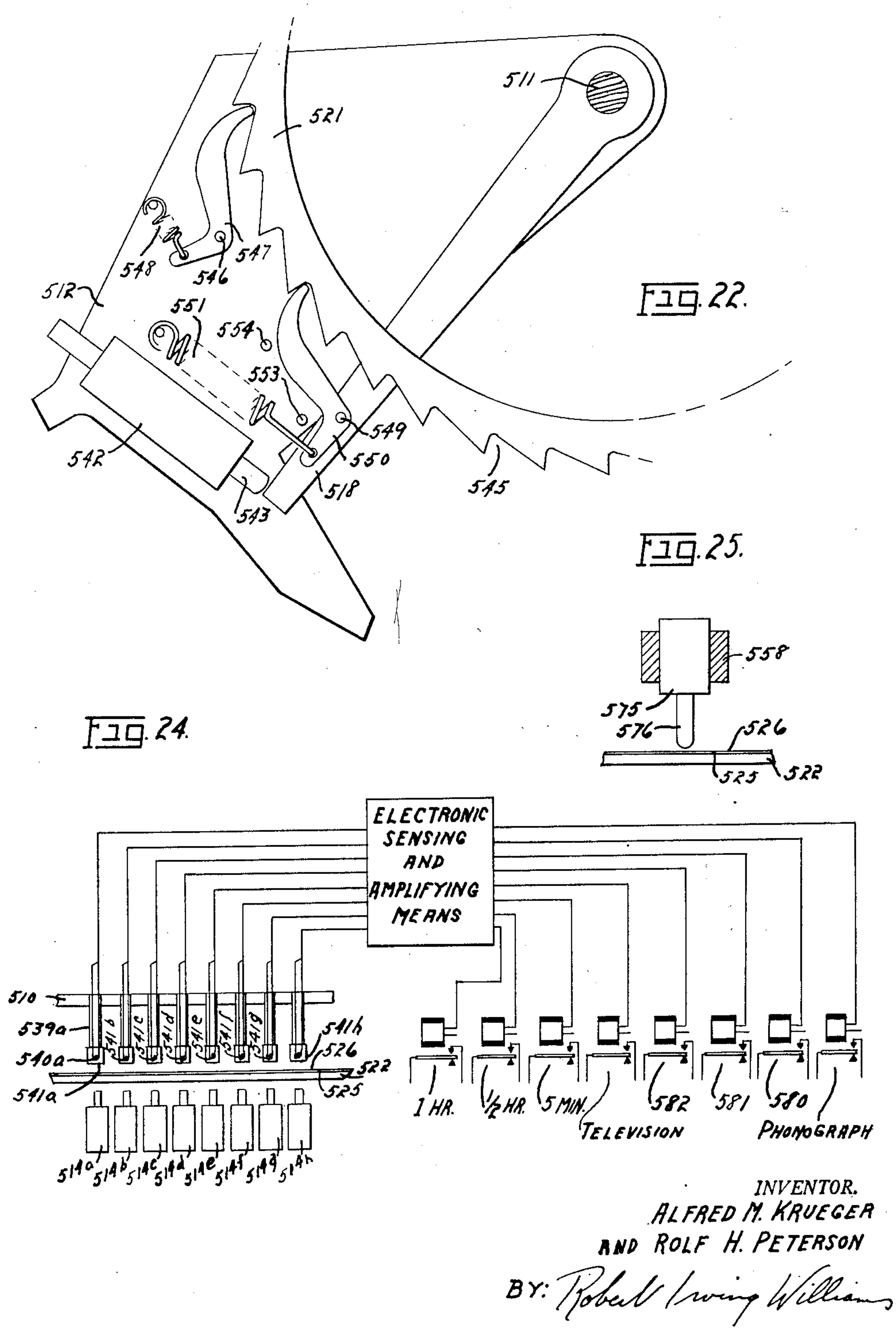
Fig. 22 is a fragmentary horizontal sectional view along the lines 22—22 of Fig. 21.
Fig. 24 is a diagrammatic view indicating the circuit arrangement used in the modification of Figs. 21–23.
Fig. 25 is a partly sectional detail view along lines 25—25 of Fig. 23.

The arm 512 carries near its outer end a solenoid 542 having a plunger 543 adapted to bear against the outer end of the arm 518. The periphery of the ring 521 is shaped in the form of a ratchet by the provision of saw-tooth notches 545, and there is pivoted at 546 on the arm 512 a pawl 547 held against the periphery of the ring 521 by a spring 548. Pivoted on the arm 518 at 549 is a pawl 550. A spring 551 serves to pull the pawl 550 against the notched periphery of the ring 521, and at the same time to draw the pawl and the arm 518 toward the end of the plunger 543. A pin 553 acts as a stop for such movement, and a pin 554 serves to positively prevent the pawl 550 from being moved outwardly until the plunger 543 moves the arm 518 and the pawl in a counterclockwise direction (Fig. 22) relative to the ring 521. Clockwise movement of the unit 520 with respect to the arm 512 is thus effectively prevented.

Figure 23:
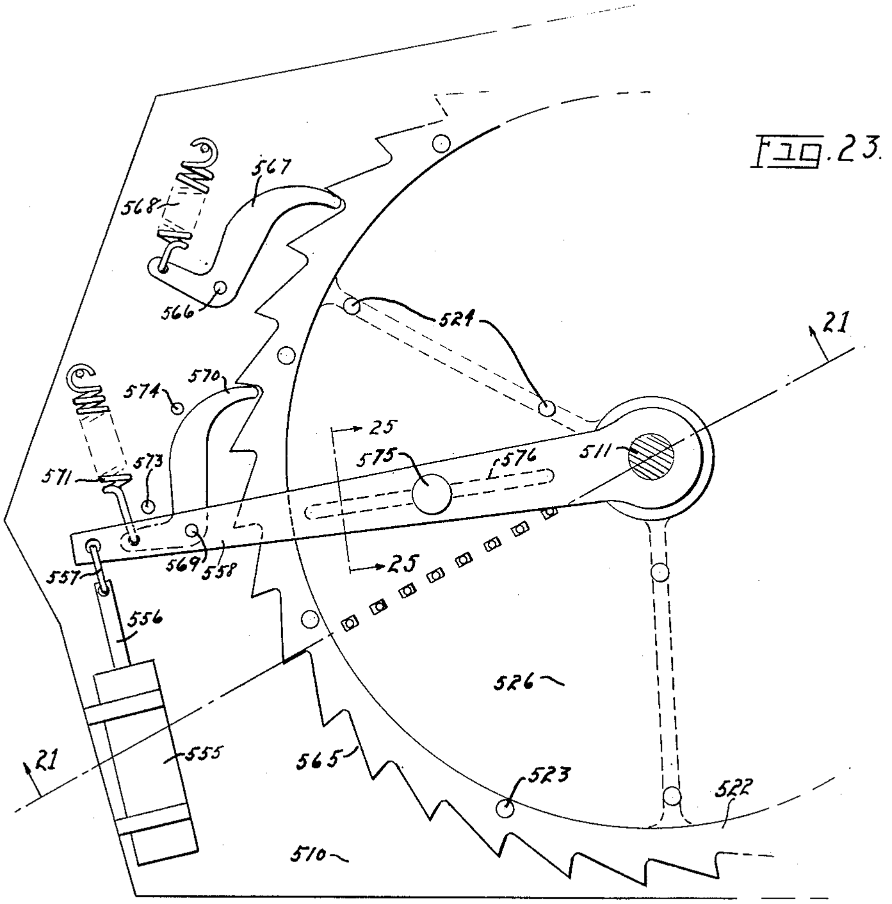
Fig. 23 is a fragmentary horizontal sectional view along the lines 23—23 of Fig. 21.

On the underside of the upper portion of the frame 510 there is mounted a solenoid 555 adapted when energized to draw in a plunger 556 which is connected by a link 557 to an arm 558 which is rotatably mounted on the shaft 511. The periphery of the disk 522 is notched as at 565, and there is pivoted at 566 on the underside of the upper portion of the frame 510 a pawl 567 which is normally held in place by a spring 568. Pivotally mounted at 569 on the arm 558 is a pawl 570, and a spring 571 serves to normally hold this pawl in place and to draw the arm away from the solenoid 565, a stop pin 573 being provided to limit this movement. A pin 574 serves to hold the pawl 570 in place and prevent any movement of the unit 520 until the arm 558 and the pawl 570 are moved in a counterclockwise direction (Fig. 23).

Mounted on arm 558 is a magnetizing unit 575 (Figs. 23 and 25) having a member 576 which will so affect the magnetic media 526 directly beneath it in such a manner as to restore that portion of the magnetic media 526 to a neutral condition. In this manner, any signals that are recorded can therefore be cancelled (erased, neutralized) and that cleared portion of the magnetic media 526 is now readied for recording a new signal pattern.

Upon the energization of selected ones of the magnetizing units 514 (e. g. magnetizing units 514*b*, 514*d*, and 514*e*) the magnetic field produced thereby will affect the magnetic media 526 in such a way as to leave an impression of the energizing magnetic field at that point. At the completion of the incoming signal the selected magnetizing units 514 are de-energized and the solenoid 542 is energized to cause a stepping or "indexing" of the unit 520 with respect to the arm 512. This results from the movement of the plunger 543 against the arm 518 in a direction which will stretch the spring 551. The arm 518 is moved enough to carry the pawl 550 in a counterclockwise direction (Fig. 22) from one notch to the next. During this action the supporting arm 512 is prevented from moving in a clockwise direction relative to the ring 521 by the holding pawl 547. When the solenoid 542 is de-energized, the spring 551 pulls the arm 512 and the arm 518 together until stop 553 contacts the arm 518. During this action the pawl 547 ratchets to the next notch 545. The pin 554 now serves to hold the pawl 550 in place and to lock the arm 512 and ring 521 together. This completes an index cycle of the arm 512 and the preselector means is ready to receive another coded signal or pattern of signals. These can be put in until the arm 512 has rotated thru 340°, or in any time after a row of magnetic media 526 has been positioned.

Signals may be taken off either after or simultaneously with the putting in of signals and until all the signals which have been put in are taken off. In the taking off of signals (Figs. 21 and 24) the pick-up head 540 is influenced by the impressed field in the magnetic media 526 (originally set-up by the input magnetizing units 514, as previously described) in such a manner that the impedance of the pick-up head coil 541 is changed. This impedance change or impedance differential is reflected or sensed by an electronic means, as well-known to the electronic art. The output from the electronic means operates the selective relays (580, 581, 582 etc., Fig. 24) in the usual manner to duplicate the pattern that was put in and recorded. Such points of the magnetic media 526 as were not altered by the magnetizing units 514 (since these magnetizing units 514 were not energized for this particular signal pattern) the impedance of the pick-up head coil 541 remains unchanged and hence no signal is reflected back to the electronic sensing and amplifying unit thereby operating no selective relay. After a signal has been picked off and sent out the taking off of the next signal is initiated by the energization of solenoid 555 to move the arm 558 in a counterclockwise position (Fig. 23) to index the pawl 570 one notch against the pull of the spring 571 to move the arm 558 in a new position with respect to the disk 522. During this action, unit 520 is prevented from following the arm 558 by the holding pawl 567 which is pivoted at 566 on frame 510. When the solenoid 555 is de-energized, the spring 571 pulls the arm 558 back to the stop pin 573, thus indexing the disk 522 (and the ring 521) in a clockwise direction. Pin 574 on frame 510 holds pawl 570 in a notch 565 of disk 522 thereby locking the relative position of disk 522 and frame 510. The unit 520 being locked to the arm 512 at this stage, the arm 512 likewise moves one step in a clockwise direction with the movement of the arm 558. This may be repeated as often as desired as long as settings have been recorded on the magnetic media 526 of the disk 525. It should be noted that the ribbed disk 522 is so designed that the ribs do not interfere with the putting-in and taking off of signals.

The magnetic type of memory unit can readily be employed in various other embodiments including those described above.

Since certain changes may be made in the above construction and different embodiments of the invention could be made without departing from the scope thereof, it is intended that all matter contained in the above description or shown in the accompanying drawing shall be interpreted as illustrative and not in a limiting sense.

We claim:

1. A memory device comprising a rotary member carrying recording portions, a group of input elements arranged for selectively making a row of recorded signals and thereafter selectively making other rows thereof, a group of take-off elements arranged to be operated in accordance with the records on said rows, one of said groups being stationary and the other being rotatable with respect to the stationary group and with respect to said rotary member, an indexing means adapted to control the relative movement of the rotatable member and the rotatable group, an indexing means adapted to control relative movement of the rotatable member and the stationary group, and electromechanical operating means therefor, said indexing means being independently and simultaneously operated, and said input and output elements being independently and simultaneously operated.

2. A memory device comprising a frame, a memory unit bearing magnetic recording media, an input unit, a take-off unit, one of said units being fixed to said frame, another of said units being mounted for a stepped rotation in one direction with respect to said frame, and the remaining one of said units being mounted for a stepped rotation in the other direction with respect to said other of said units and in either direction with respect to said frame, said input unit being adapted to selectively change the magnetic characteristics of portions of said media, and said take-off unit being selectively affected by the magnetic characteristics of portions of said media, and means to restore the original characteristics of said media after the operation of said take-off unit.

3. A memory device comprising a frame, a memory unit bearing magnetic recording media, an input unit, a take-off unit, one of said units being fixed to said frame, another of said units being mounted for a stepped rotation in one direction with respect to said frame, and the remaining one of said units being mounted for a stepped rotation in the other direction with respect to said other of said units and in either direction with respect to said frame, said input unit being adapted to selectively alter the magnetic qualities of portions of said media, means to clear said memory unit following the operation of the take-off unit, and means to render said clearing means inoperative when desired.

4. A memory device comprising a frame, a memory unit bearing magnetic recording media, an input unit, a take-off unit, one of said units being fixed to said frame, another of said units being mounted for a stepped rotation in one direction with respect to said frame, and the remaining one of said units being mounted for a stepped rotation in the other direction with respect to said other of said units and in either direction with respect to said frame, said input unit being adapted to selectively alter the magnetic qualities of portions of said media, an electronic reproducer, control means therefor, means to operate said input unit by said control means, and means to operate said electronic reproducer in accordance with the operation of said take-off means.

5. A memory device comprising a frame, a memory unit bearing magnetic recording media, an input unit, a take-off unit, one of said units being fixed to said frame, another of said units being mounted for a stepped rotation in one direction with respect to said frame, and the remaining one of said units being mounted for a stepped rotation in the other direction with respect to said other of said units and in either direction with respect to said frame, said input unit being adapted to selectively alter the magnetic qualities of portions of said media, a record player, control means therefor, means to operate said input unit by said control means, and means to operate said record player in accordance with the operation of said take-off means.

6. A memory device comprising a frame, a fixed transmission member, a storage member, means to move said storage member thru angles of uniform extent step-by-step about an axis in one direction relative to the frame and a transmission member movable with said storage member and about an axis in one direction relative to the frame and when inoperative being locked to and carried along with said storage member and when operative movable step-by-step independently of said storage member about said axis in the opposite direction relative to the frame, means to move said movable transmission member step-by-step thru angles of said uniform extent in said opposite direction, one of said transmission members being adapted to effect a step-by-step modification of the character of the storage member at various ones of a series of sets of points thereon, and the other of said transmission members being adapted to be affected step-by-step by the character of the sets of points of said series.

7. A memory device as set forth in claim 6 wherein said one of said transmission members comprises a set of operating elements thru which said series of sets of points are actuated step-by-step and wherein said other of said transmission members comprises a set of operable elements which are affected by the sets of points.

8. A memory device comprising a frame, a fixed transmission member, a storage member movable step-by-step thru angles of uniform extent about an axis in one direction relative to the frame, a transmission member movable with said storage member and also movable step-by-step thru angles of said uniform extent about an axis in the opposite direction relative to the frame, stepping means to move said storage member thru said angles in said one direction, and stepping means to move said movable transmission member thru said angles in said opposite direction, one of said transmission members being adapted to effect a step-by-step modification of the character of the storage member at various ones of a series of sets of points thereon, and the other of said transmission members being adapted to be affected step-by-step by the character of the sets of points of said series, and a pair of electromechanical means, one being a remote control operating means for selectively actuating the character-modifying transmission member and the other being operable by the affected transmission member.

9. A memory device comprising a frame, a fixed output member providing a set of operable elements, rotatable storage means movable step-by-step to bring a series of sets of points on said storage means into operative relation one after another with said set of operable elements, a rotatable input member providing a set of operating elements corresponding to said set of operable elements, operating means for selectively actuating the operating elements of said input member to cause an alteration in the condition of said storage means at certain of said points, means to cause a stepping operation of said input member along the storage means thru angles of equal extent for each such operation of an operating element, stepping means to step said storage means along said output member thru angles of said equal extent to bring said set of operable elements into operative relation with one after another of the sets of said series of sets of points to cause them to be operated in accordance with the alterations in condition of said points brought about by the elements on said input member, and output-controlled means operated by the setting of the operable elements of said output member.

10. A memory device comprising a frame, a fixed input member providing a set of operating elements, rotatable storage means movable step-by-step to bring a series of sets of points on said storage means into operative relation one after another with said set of operating elements, operating means for selectively actuating the operating elements of said input member to cause an alteration in the condition of said storage member at certain of said points, means to cause a stepping operation of the storage means thru angles of equal extent for each such operation of an operating element, a rotatable output member providing a set of operable elements corresponding to said set of operating elements, stepping means to step said output member thru angles of said equal extent along said storage means to bring said set of operable elements into operative relation with one after another of the sets of said series of sets of points to cause them to be operated in accordance with the alterations in condition of said points brought about by the elements on said input member, and means operated by the setting of the operable elements of said output member.

11. A memory device as set forth in claim 9 wherein there is provided between said input member and said storage means a step-by-step connection for carrying the input member with the storage means during the rotation of the latter.

12. A memory device as set forth in claim 10 wherein there is provided between said output member and said storage means a step-by-step connection for carrying the output member with the storage means during the rotation of the latter.

13. A memory device as set forth in claim 6 wherein there are provided a pair of concentric shafts mounted on the frame for independent rotation, said storage member being mounted on one of said shafts and said movable transmission member being mounted on the other of said shafts.

14. A memory device comprising a frame, a memory unit bearing recording media, an input unit, a take-off unit, one of said units being fixed to said frame, another of said units being mounted for stepped rotation in one direction with respect to said frame, means to impart steps thru angles of uniform extent to said other of said units in said one direction, and the remaining one of said units being mounted for a stepped rotation in the other direction with respect to said other of said units and in either direction with respect to said frame, means to impart steps thru angles of said uniform extent to the said remaining one of said units in said other direction, said input unit being adapted to selectively change the characteristics of portions of said media, and said take-off unit being selectively affected by the characteristics of portions of said media, and means to restore the original characteristics of said media.

15. A memory device comprising a frame, a memory unit bearing mechanical recording media, an input unit, a take-off unit, one of said units being fixed to said frame, another of said units being mounted for a stepped rotation in one direction with respect to said frame, means to impart steps thru angles of uniform extent to said other of said units in said one direction, and the remaining one of said units being mounted for a stepped rotation in the other direction with respect to said other of said units and in either direction with respect to said frame, means to impart steps thru angles of said uniform extent to the said remaining one of said units in said other direction, said input unit being adapted to selectively change the characteristics of portions of said media, and said take-off unit being selectively affected by the mechanical positions of portions of said media, and means to restore said media to the original positions thereof.

16. A memory device comprising a frame, a memory unit bearing recording media, an input unit, a take-off unit, one of said units being fixed to said frame, another of said units being mounted for a stepped rotation in one direction with respect to said frame, means to impart steps thru angles of uniform extent to said other of said units in said one direction, and the remaining one of said units being mounted for a stepped rotation in the other direction with respect to said other of said units and in either direction with respect to said frame, means to impart steps thru angles of said uniform extent to said remaining one of said units in said other direction, said input unit being adapted to selectively change the characteristics of portions of said media, and said take-off unit being selectively affected by the characteristics of portions of said media, and means to restore the original characteristics of said media, said stepping means being independently and simultaneously operable.

17. A memory device comprising a frame, a memory unit bearing recording media, an input unit, a take-off unit, one of said units being fixed to said frame, another of said units being mounted for a stepped rotation in one direction with respect to said frame, and the remaining one of said units being mounted for a stepped rotation in the other direction with respect to said other of said units and in either direction with respect to said frame, said input unit being adapted to selectively alter the characteristics of portions of said media, means to impart stepped rotation to said other of said units thru angles of uniform extent, and means to impart stepped rotation to said remaining one of said units thru angles of said uniform extent, means to clear said memory unit following the operation of the take-off unit, and means to render said clearing means inoperative when desired.

18. A memory device comprising a frame, a memory unit bearing mechanical recording media, an input unit, a take-off unit, one of said units being fixed to said frame, another of said units being mounted for a stepped rotation in one direction with respect to said frame, and the remaining one of said units being mounted for a stepped rotation in the other direction with respect to said other of said units and in either direction with respect to said frame, said input unit being adapted to selectively alter the positions of portions of said media, means to impart stepped rotation to said other of said units thru angles of uniform extent, and means to impart stepped rotation to said remaining one of said units thru angles of said uniform extent, means to clear said memory unit following the operation of the take-off unit, and means to render said clearing means inoperative when desired.

19. A device as set forth in claim 14 wherein there are provided selectively-operable means, control mechanism therefor, and means including said take-off unit to cause selective operation of the selectively-operable means pursuant to the characteristics of successive portions of said media at times determined by said control means.

20. A device as set forth in claim 14 wherein the input unit and the take-off unit are independently and simultaneously operative.

21. A device as set forth in claim 14 wherein each stepping means is mounted for relative movement with respect to its unit, holding means for either of the movable units and mounted on the other thereof, and fixedly-mounted holding means for the movable unit not so held.

22. A memory device comprising a frame, a memory unit bearing mechanical recording media, an input unit bearing a series of sets of electro-mechanical operating elements, a take-off unit, one of said units being fixed to said frame, another of said units being mounted for a stepped rotation in one direction with respect to said frame, means to impart steps thru angles of uniform extent to said other of said units in said one direction, and the remaining one of said units being mounted for a stepped rotation in the other direction with respect to said other of said units and in either direction with respect to said frame, means to impart steps thru angles of said uniform extent to the said remaining one of said units in said other direction, said input unit being adapted to selectively change the characteristics of portions of said media, and said take-off unit being selectively affected by the mechanical positions of portions of said media, means to restore said media to the original positions thereof, electro-mechanical selective control means for operating the members of certain of said sets of electro-mechanical elements in various desired permutations and combinations and means for sequentially taking off the settings thus selected.

23. A memory device as set forth in claim 14 wherein the recording media is in the form of a series of pluralities of mechanically settable elements, wherein the input unit comprises a series of pluralities of electro-mechanical setting elements, and wherein the take-off unit comprises a series of pluralities of electro-mechanical take-off elements.

24. A device as set forth in claim 14 wherein pawl and ratchet mechanism connects said input unit with said memory unit and wherein pawl and ratchet mechanism connects said take-off unit with said memory unit.

25. A memory device comprising a frame, a fixed transmission member, a storage member, means to move said storage member thru angles of uniform extent step-by-step about an axis in one direction relative to the frame and a transmission member movable with said storage member and about an axis in one direction relative to the frame and when inoperative being locked to and carried along with said storage member and when operative movable step-by-step independently of said storage member about said axis in the opposite direction relative to the frame, means to move said movable transmission member step-by-step thru angles of said uniform extent in said opposite direction, one of said transmission members being adapted to effect a step-by-step modification of the character of the storage member at various ones of a series of sets of points thereon, the other of said transmission members being adapted to be affected step-by-step by the character of the sets of points of said series, means to limit the relative rotation of the storage member with respect to the fixed transmission member to not over 360°, and means to limit the relative rotation of the movable transmission member in said opposite direction with respect to the fixed transmission member to not over 360°.

26. A memory device comprising a frame, a memory unit bearing recording media, an input unit, a take-off unit, one of said units being fixed to said frame, another of said units being mounted for stepped rotation in one direction with respect to said frame, means to impart steps thru angles of uniform extent to said other of said units in said one direction, and the remaining one of said units being mounted for a stepped rotation in the other direction with respect to said other of said units and in either direction with respect to said frame, means to impart steps thru angles of said uniform extent to the said remaining one of said units in said other direction, said input unit being adapted to selectively change the characteristics of portions of said media, and said take-off unit being selectively affected by the characteristics of portions of said media, means to restore the original characteristics of said media, pawl and ratchet means associating a pair of said units, and means to prevent the operation of said pawl except when a particular one of said pair of units is moved whereby the operation of the other of said units is normally prevented.

27. A memory device as set forth in claim 14 wherein the memory unit is a rotatable storage drum, wherein the input unit carries a group of input elements arranged spirally with respect to said drum, and wherein the take-off unit comprises a group of output elements arranged spirally with respect to said drum.

28. A memory device as set forth in claim 14 wherein the memory unit comprises a series of rotatable disks on which slidable elements are arranged, wherein there are provided on the frame a group of elements mounted for operation of said slidable elements, and wherein the take-off unit is operated in accordance with the position of said slidable elements.

ALFRED M. KRUEGER.
ROLF H. PETERSON.

REFERENCES CITED

The following references are of record in the file of this patent:

UNITED STATES PATENTS

| Number | Name | Date |
|---|---|---|
| 1,972,921 | Dodds | Sept. 11, 1934 |
| 2,130,164 | Verkins | Sept. 13, 1938 |
| 2,370,134 | Begun | Feb. 27, 1945 |